US012596614B2

(12) United States Patent
Wang et al.

(10) Patent No.: US 12,596,614 B2
(45) Date of Patent: Apr. 7, 2026

(54) RESET TECHNIQUES FOR PROTOCOL LAYERS OF A MEMORY SYSTEM

(71) Applicant: Micron Technology, Inc., Boise, ID (US)

(72) Inventors: Junjun Wang, Shanghai (CN); Zhanqiang Su, Shanghai (CN)

(73) Assignee: Micron Technology, Inc., Boise, ID (US)

( * ) Notice: Subject to any disclaimer, the term of this patent is extended or adjusted under 35 U.S.C. 154(b) by 8 days.

(21) Appl. No.: 18/590,755

(22) Filed: Feb. 28, 2024

(65) Prior Publication Data

US 2024/0297928 A1 Sep. 5, 2024

Related U.S. Application Data

(60) Provisional application No. 63/449,731, filed on Mar. 3, 2023.

(51) Int. Cl.
*G06F 11/14* (2006.01)
(52) U.S. Cl.
CPC ........ *G06F 11/1441* (2013.01); *G06F 11/142* (2013.01); *G06F 11/1443* (2013.01)
(58) Field of Classification Search
CPC ............. G06F 11/1441; G06F 11/1443; G06F 11/142; G06F 3/0632; G06F 13/382
See application file for complete search history.

(56) References Cited

U.S. PATENT DOCUMENTS

2017/0102893 A1* 4/2017 Yoon ..................... G06F 3/0632
2019/0347156 A1* 11/2019 Arroyo ............... G06F 11/1441
2021/0334225 A1* 10/2021 Seo ...................... G06F 13/1668
2023/0188256 A1* 6/2023 Yu .......................... H04L 1/0041
714/774
2023/0229606 A1* 7/2023 Vergis ................. G06F 13/4282
710/52
2024/0202060 A1* 6/2024 Shih ..................... G06F 11/1443
2024/0202142 A1* 6/2024 Lin ...................... G06F 13/1668

OTHER PUBLICATIONS

"JEDEC Standard Universal Flash Storage (UFS) Version 2.2 JESD220C-2.2", Aug. 2020, JEDEC Solid State Technology Association (Year: 2020).*

* cited by examiner

*Primary Examiner* — Marc Duncan
*Assistant Examiner* — Albert Li
(74) *Attorney, Agent, or Firm* — Holland & Hart LLP

(57) ABSTRACT

Methods, systems, and devices for reset techniques for protocol layers of a memory system are described. A communications link may be established between a host system and the memory system. In some examples, the communications link may be based on one or more first parameters associated with a first protocol layer and one or more second parameters associated with a second protocol layer. The system may support communication (e.g., from the host system to the memory system) of an indication to reset the communications link, and the host system, the memory system, or both may reset the one or more first parameters based on communicating the indication to reset the communications link. The host system and memory system may attempt to reestablish the communications link based on resetting the one or more first parameters and maintaining the one or more second parameters.

20 Claims, 8 Drawing Sheets

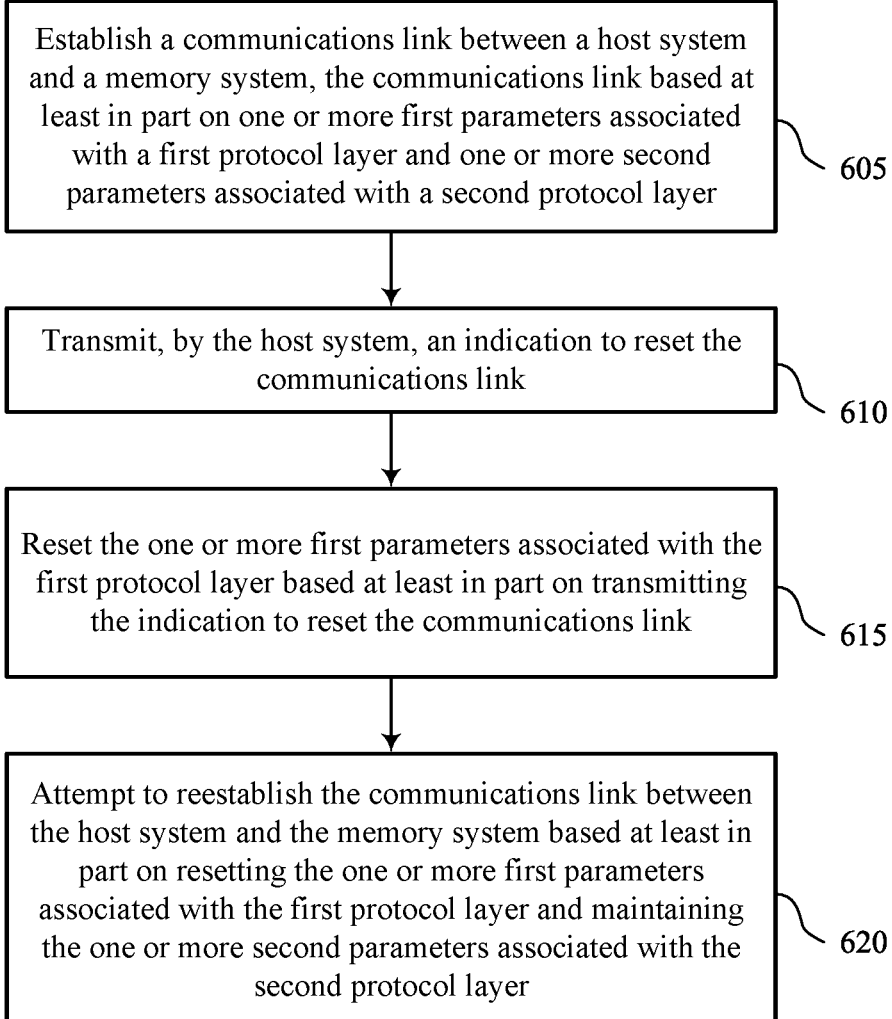

Establish a communications link between a host system and a memory system, the communications link based at least in part on one or more first parameters associated with a first protocol layer and one or more second parameters associated with a second protocol layer

605

Transmit, by the host system, an indication to reset the communications link

610

Reset the one or more first parameters associated with the first protocol layer based at least in part on transmitting the indication to reset the communications link

615

Attempt to reestablish the communications link between the host system and the memory system based at least in part on resetting the one or more first parameters associated with the first protocol layer and maintaining the one or more second parameters associated with the second protocol layer

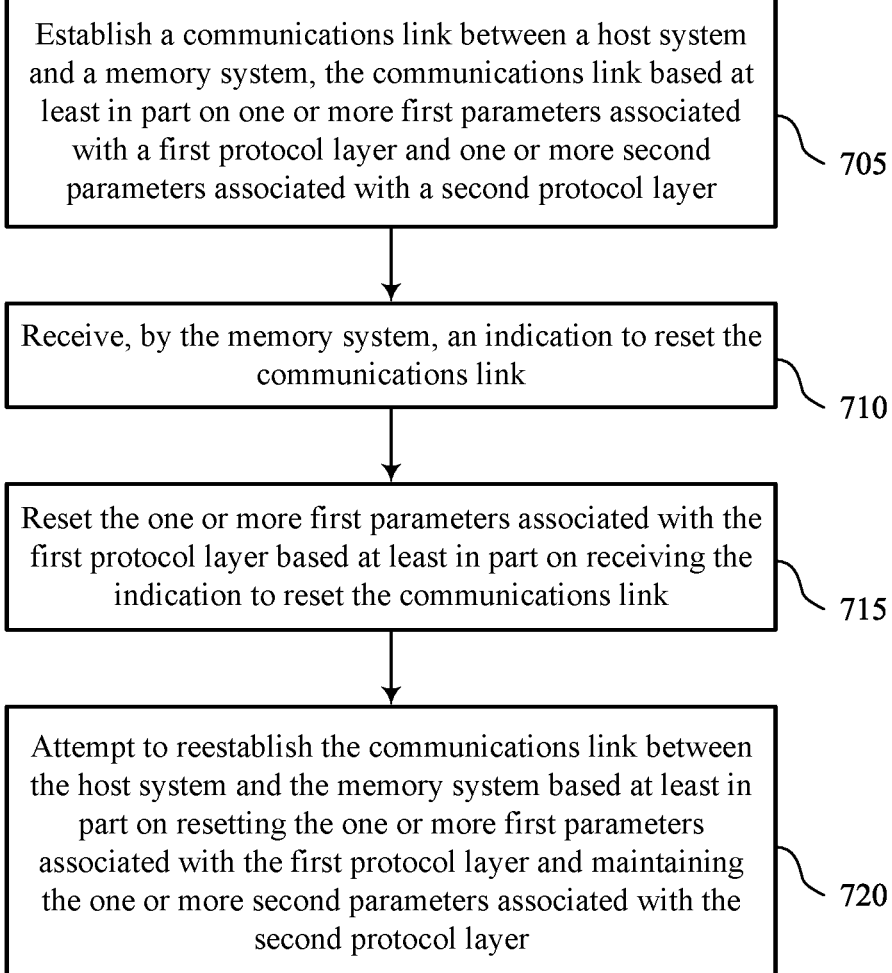

Establish a communications link between a host system and a memory system, the communications link based at least in part on one or more first parameters associated with a first protocol layer and one or more second parameters associated with a second protocol layer

705

Receive, by the memory system, an indication to reset the communications link

710

Reset the one or more first parameters associated with the first protocol layer based at least in part on receiving the indication to reset the communications link

715

Attempt to reestablish the communications link between the host system and the memory system based at least in part on resetting the one or more first parameters associated with the first protocol layer and maintaining the one or more second parameters associated with the second protocol layer

RESET TECHNIQUES FOR PROTOCOL LAYERS OF A MEMORY SYSTEM

CROSS REFERENCE

The present Application for Patent claims the benefit of U.S. Provisional Patent Application No. 63/449,731 by WANG et al., entitled "RESET TECHNIQUES FOR PRO-TOCOL LAYERS OF A MEMORY SYSTEM," filed Mar. 3, 2023, assigned to the assignee hereof, and expressly incorporated by reference in its entirety herein.

TECHNICAL FIELD

The following relates to one or more systems for memory, including reset techniques for protocol layers of a memory system.

BACKGROUND

Memory devices are widely used to store information in devices such as computers, user devices, wireless communication devices, cameras, digital displays, and others. Information is stored by programming memory cells within a memory device to various states. For example, binary memory cells may be programmed to one of two supported states, often denoted by a logic 1 or a logic 0. In some examples, a single memory cell may support more than two states, any one of which may be stored. To access the stored information, the memory device may read (e.g., sense, detect, retrieve, determine) states from the memory cells. To store information, the memory device may write (e.g., program, set, assign) states to the memory cells.

Various types of memory devices exist, including magnetic hard disks, random access memory (RAM), read-only memory (ROM), dynamic RAM (DRAM), synchronous dynamic RAM (SDRAM), static RAM (SRAM), ferroelectric RAM (FeRAM), magnetic RAM (MRAM), resistive RAM (RRAM), flash memory, phase change memory (PCM), self-selecting memory, chalcogenide memory technologies, not-or (NOR) and not-and (NAND) memory devices, and others. Memory cells may be described in terms of volatile configurations or non-volatile configurations. Memory cells configured in a non-volatile configuration may maintain stored logic states for extended periods of time even in the absence of an external power source. Memory cells configured in a volatile configuration may lose stored states when disconnected from an external power source.

BRIEF DESCRIPTION OF THE DRAWINGS

FIGS. 6 and 7 illustrate flowcharts showing methods that support reset techniques for protocol layers of a memory system in accordance with examples as disclosed herein.

DETAILED DESCRIPTION

Figure 1:
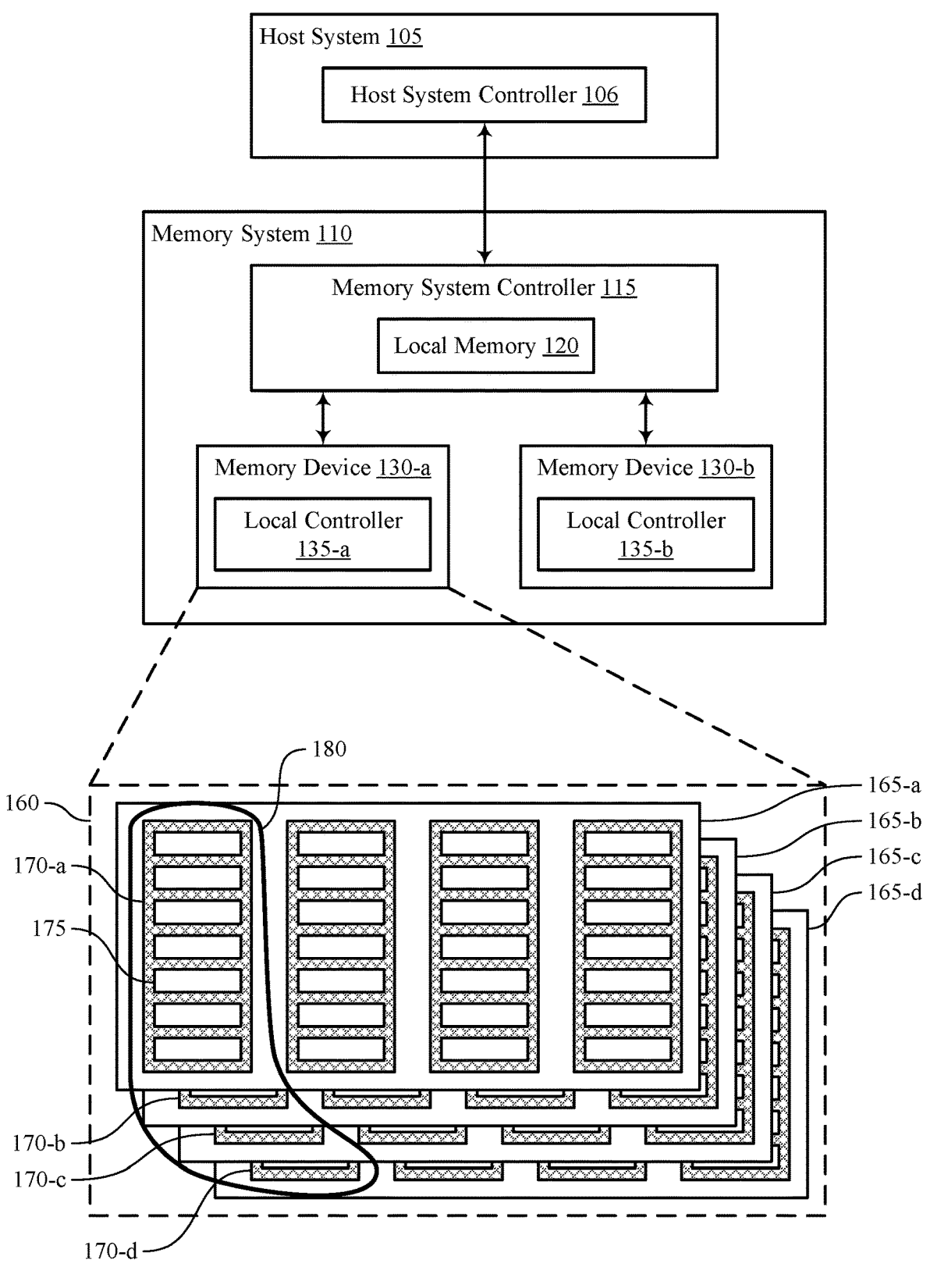
FIG. 1 illustrates an example of a system that support reset techniques for protocol layers of a memory system in accordance with examples as disclosed herein.

In some implementations, a memory system and a host system may communicate with one another in accordance with a protocol stack that includes multiple protocol layers. An upper (e.g., topmost) layer of the protocol stack may include a universal flash storage (UFS) layer and a lower (e.g., bottommost) layer of the protocol stack may include a physical layer. A Unipro layer may be included between the UFS layer and the physical layer, and may include a data link (DL) layer and a physical adapter (PA) layer, among other layers. To communicate information (e.g., data, control information, protocol information) between the host system and the memory system (e.g., over a communications link established in accordance with the protocol stack), the information may pass through the protocol stack at a transmitting system (e.g., one of the host system or the memory system) from higher layers to lower layers, and subsequently pass through the protocol stack at a receiving system (e.g., the other of the host system or the memory system) from lower layers to higher layers.

In some examples, an error may occur with a communications link established between a host system and a memory system in accordance with the protocol stack (e.g., during the communication of information). For example, an error may be associated with one or more layers of the protocol stack, such as the DL layer or the PA layer. In response to the error, the memory system and the host system may perform a recovery procedure in an attempt to recover from the error. As one example, the memory system may perform a hardware (HW) reset, which may reset attributes associated with one or more protocol layers. For example, in accordance with some reset techniques, a HW reset may reset all Unipro layer attributes as well as all UFS layer attributes. Resetting UFS layer attributes may be unnecessary, however, if an error occurred at the Unipro layer (e.g., at a PA layer, at a DL layer). Thus, performing a HW reset for a Unipro error (e.g., for a PA error, for a DL error) may introduce unnecessary latency associated with resetting UFS attributes.

As described herein, a memory system, a host system, or both may reset parameters associated with a first protocol layer (e.g., Unipro layer parameters) in an attempt to recover from one or more errors while maintaining parameters associated with a second protocol layer (e.g., UFS layer parameters). For example, the host system and the memory system may establish a communications link. The communications link may be associated with one or more parameters (e.g., attributes) of a first protocol layer (e.g., a Unipro layer) and one or more parameters (e.g., attributes) of a second protocol layer (e.g., a UFS layer). In some examples, the memory system or the host system may detect that an error has occurred at the Unipro layer (e.g., at a DL layer, at a PA layer). In response to the error, the host system may transmit an indication (e.g., a command, a request) to the memory system to reset the communications link. The memory system, or the host system, or both may reset the one or more parameters associated with the first protocol layer and perform a link startup sequence (LSS) in an attempt to reestablish the communications link. During such recovery procedure, the one or more parameters of the second protocol layer may be maintained, resulting in reduced latency compared to performing a HW reset.

In addition to applicability in memory systems as described herein, techniques for improved reset techniques for protocol layers of a memory system may be generally implemented to improve the performance of various electronic devices and systems (including artificial intelligence (AI) applications, augmented reality (AR) applications, virtual reality (VR) applications, and gaming). Some electronic device applications, including high-performance applications such as AI, AR, VR, and gaming, may be associated with relatively high processing requirements to satisfy user expectations. As such, increasing processing capabilities of the electronic devices by decreasing response times, improving power consumption, reducing complexity, increasing data throughput or access speeds, decreasing communication times, or increasing memory capacity or density, among other performance indicators, may improve user experience or appeal. Implementing the techniques described herein may improve the performance of electronic devices by facilitating more efficient and effective reset techniques for protocol layers of a memory system, which may decrease processing or latency times, improve response times, or otherwise improve user experience, among other benefits.

Features of the disclosure are initially described in the context of systems with reference to FIG. 1. Features of the disclosure are described in the context of a protocol architecture and a process flow with reference to FIGS. 2 and 3. These and other features of the disclosure are further illustrated by and described in the context of apparatus diagrams and flowcharts that relate to reset techniques for protocol layers of a memory system with reference to FIGS. 4 through 7.

FIG. 1 illustrates an example of a system 100 that supports reset techniques for protocol layers of a memory system in accordance with examples as disclosed herein. The system 100 includes a host system 105 coupled with a memory system 110. The system 100 may be included in a computing device such as a desktop computer, a laptop computer, a network server, a mobile device, a vehicle (e.g., airplane, drone, train, automobile, or other conveyance), an Internet of Things (IoT) enabled device, an embedded computer (e.g., one included in a vehicle, industrial equipment, or a networked commercial device), or any other computing device that includes memory and a processing device.

A memory system 110 may be or include any device or collection of devices, where the device or collection of devices includes at least one memory array. For example, a memory system 110 may be or include a Universal Flash Storage (UFS) device, an embedded Multi-Media Controller (eMMC) device, a flash device, a universal serial bus (USB) flash device, a secure digital (SD) card, a solid-state drive (SSD), a hard disk drive (HDD), a dual in-line memory module (DIMM), a small outline DIMM (SO-DIMM), or a non-volatile DIMM (NVDIMM), among other devices.

The system 100 may include a host system 105, which may be coupled with the memory system 110. In some examples, this coupling may include an interface with a host system controller 106, which may be an example of a controller or control component configured to cause the host system 105 to perform various operations in accordance with examples as described herein. The host system 105 may include one or more devices and, in some cases, may include a processor chipset and a software stack executed by the processor chipset. For example, the host system 105 may include an application configured for communicating with the memory system 110 or a device therein. The processor chipset may include one or more cores, one or more caches (e.g., memory local to or included in the host system 105), a memory controller (e.g., NVDIMM controller), and a storage protocol controller (e.g., peripheral component interconnect express (PCIe) controller, serial advanced technology attachment (SATA) controller). The host system 105 may use the memory system 110, for example, to write data to the memory system 110 and read data from the memory system 110. Although one memory system 110 is shown in FIG. 1, the host system 105 may be coupled with any quantity of memory systems 110.

The host system 105 may be coupled with the memory system 110 via at least one physical host interface. The host system 105 and the memory system 110 may, in some cases, be configured to communicate via a physical host interface using an associated protocol (e.g., to exchange or otherwise communicate control, address, data, and other signals between the memory system 110 and the host system 105). Examples of a physical host interface may include, but are not limited to, a SATA interface, a UFS interface, an eMMC interface, a PCIe interface, a USB interface, a Fiber Channel interface, a Small Computer System Interface (SCSI), a Serial Attached SCSI (SAS), a Double Data Rate (DDR) interface, a DIMM interface (e.g., DIMM socket interface that supports DDR), an Open NAND Flash Interface (ONFI), and a Low Power Double Data Rate (LPDDR) interface. In some examples, one or more such interfaces may be included in or otherwise supported between a host system controller 106 of the host system 105 and a memory system controller 115 of the memory system 110. In some examples, the host system 105 may be coupled with the memory system 110 (e.g., the host system controller 106 may be coupled with the memory system controller 115) via a respective physical host interface for each memory device 130 included in the memory system 110, or via a respective physical host interface for each type of memory device 130 included in the memory system 110.

The memory system 110 may include a memory system controller 115 and one or more memory devices 130. A memory device 130 may include one or more memory arrays of any type of memory cells (e.g., non-volatile memory cells, volatile memory cells, or any combination thereof). Although two memory devices 130-a and 130-b are shown in the example of FIG. 1, the memory system 110 may include any quantity of memory devices 130. Further, if the memory system 110 includes more than one memory device 130, different memory devices 130 within the memory system 110 may include the same or different types of memory cells.

The memory system controller 115 may be coupled with and communicate with the host system 105 (e.g., via the physical host interface) and may be an example of a controller or control component configured to cause the memory system 110 to perform various operations in accordance with examples as described herein. The memory system controller 115 may also be coupled with and communicate with memory devices 130 to perform operations such as reading data, writing data, erasing data, or refreshing data at a memory device 130—among other such operations—which may generically be referred to as access operations. In some cases, the memory system controller 115 may receive commands from the host system 105 and communicate with one or more memory devices 130 to execute such commands (e.g., at memory arrays within the one or more memory devices 130). For example, the memory system controller 115 may receive commands or operations from the host system 105 and may convert the commands or operations into instructions or appropriate commands to achieve the desired access of the memory devices 130. In some cases, the memory system controller 115 may exchange data with the host system 105 and with one or more memory devices 130 (e.g., in response to or otherwise in association with commands from the host system 105). For example, the memory system controller 115 may convert responses (e.g., data packets or other signals) associated with the memory devices 130 into corresponding signals for the host system 105.

The memory system controller 115 may be configured for other operations associated with the memory devices 130. For example, the memory system controller 115 may execute or manage operations such as wear-leveling operations, garbage collection operations, error control operations such as error-detecting operations or error-correcting operations, encryption operations, caching operations, media management operations, background refresh, health monitoring, and address translations between logical addresses (e.g., logical block addresses (LBAs)) associated with commands from the host system 105 and physical addresses (e.g., physical block addresses) associated with memory cells within the memory devices 130.

The memory system controller 115 may include hardware such as one or more integrated circuits or discrete components, a buffer memory, or a combination thereof. The hardware may include circuitry with dedicated (e.g., hardcoded) logic to perform the operations ascribed herein to the memory system controller 115. The memory system controller 115 may be or include a microcontroller, special purpose logic circuitry (e.g., a field programmable gate array (FPGA), an application specific integrated circuit (ASIC), a digital signal processor (DSP)), or any other suitable processor or processing circuitry.

The memory system controller 115 may also include a local memory 120. In some cases, the local memory 120 may include read-only memory (ROM) or other memory that may store operating code (e.g., executable instructions) executable by the memory system controller 115 to perform functions ascribed herein to the memory system controller 115. In some cases, the local memory 120 may additionally, or alternatively, include static random access memory (SRAM) or other memory that may be used by the memory system controller 115 for internal storage or calculations, for example, related to the functions ascribed herein to the memory system controller 115. Additionally, or alternatively, the local memory 120 may serve as a cache for the memory system controller 115. For example, data may be stored in the local memory 120 if read from or written to a memory device 130, and the data may be available within the local memory 120 for subsequent retrieval for or manipulation (e.g., updating) by the host system 105 (e.g., with reduced latency relative to a memory device 130) in accordance with a cache policy.

Although the example of the memory system 110 in FIG. 1 has been illustrated as including the memory system controller 115, in some cases, a memory system 110 may not include a memory system controller 115. For example, the memory system 110 may additionally, or alternatively, rely on an external controller (e.g., implemented by the host system 105) or one or more local controllers 135, which may be internal to memory devices 130, respectively, to perform the functions ascribed herein to the memory system controller 115. In general, one or more functions ascribed herein to the memory system controller 115 may, in some cases, be performed instead by the host system 105, a local controller 135, or any combination thereof. In some cases, a memory device 130 that is managed at least in part by a memory system controller 115 may be referred to as a managed memory device. An example of a managed memory device is a managed NAND (MNAND) device.

A memory device 130 may include one or more arrays of non-volatile memory cells. For example, a memory device 130 may include NAND (e.g., NAND flash) memory, ROM, phase change memory (PCM), self-selecting memory, other chalcogenide-based memories, ferroelectric random access memory (FeRAM), magneto RAM (MRAM), NOR (e.g., NOR flash) memory, Spin Transfer Torque (STT)-MRAM, conductive bridging RAM (CBRAM), resistive random access memory (RRAM), oxide based RRAM (OxRAM), electrically erasable programmable ROM (EEPROM), or any combination thereof.

Additionally, or alternatively, a memory device 130 may include one or more arrays of volatile memory cells. For example, a memory device 130 may include RAM memory cells, such as dynamic RAM (DRAM) memory cells and synchronous DRAM (SDRAM) memory cells.

In some examples, a memory device 130 may include (e.g., on a same die or within a same package) a local controller 135, which may execute operations on one or more memory cells of the respective memory device 130. A local controller 135 may operate in conjunction with a memory system controller 115 or may perform one or more functions ascribed herein to the memory system controller 115. For example, as illustrated in FIG. 1, a memory device 130-a may include a local controller 135-a and a memory device 130-b may include a local controller 135-b.

In some cases, a memory device 130 may be or include a NAND device (e.g., NAND flash device). A memory device 130 may be or include a die 160 (e.g., a memory die). For example, in some cases, a memory device 130 may be a package that includes one or more dies 160. A die 160 may, in some examples, be a piece of electronics-grade semiconductor cut from a wafer (e.g., a silicon die cut from a silicon wafer). Each die 160 may include one or more planes 165, and each plane 165 may include a respective set of blocks 170, where each block 170 may include a respective set of pages 175, and each page 175 may include a set of memory cells.

In some cases, planes 165 may refer to groups of blocks 170 and, in some cases, concurrent operations may be performed on different planes 165. For example, concurrent operations may be performed on memory cells within different blocks 170 so long as the different blocks 170 are in different planes 165. In some cases, an individual block 170 may be referred to as a physical block, and a virtual block 180 may refer to a group of blocks 170 within which concurrent operations may occur. For example, concurrent operations may be performed on blocks 170-a, 170-b, 170-c, and 170-d that are within planes 165-a, 165-b, 165-c, and 165-d, respectively, and blocks 170-a. 170-b, 170-c, and 170-d may be collectively referred to as a virtual block 180. In some cases, a virtual block may include blocks 170 from different memory devices 130 (e.g., including blocks in one or more planes of memory device 130-a and memory device 130-b). In some cases, the blocks 170 within a virtual block may have the same block address within their respective planes 165 (e.g., block 170-a may be "block 0" of plane 165-a, block 170-b may be "block 0)" of plane 165-b, and so on). In some cases, performing concurrent operations in different planes 165 may be subject to one or more restrictions, such as concurrent operations being performed on memory cells within different pages 175 that have the same page address within their respective planes 165 (e.g., related to command decoding, page address decoding circuitry, or other circuitry being shared across planes 165).

For some NAND architectures, memory cells may be read and programmed (e.g., written) at a first level of granularity (e.g., at a page level of granularity, or portion thereof) but may be erased at a second level of granularity (e.g., at a block level of granularity). That is, a page 175 may be the smallest unit of memory (e.g., set of memory cells) that may be independently programmed or read (e.g., programed or read concurrently as part of a single program or read operation), and a block 170 may be the smallest unit of memory (e.g., set of memory cells) that may be independently erased (e.g., erased concurrently as part of a single erase operation). Further, in some cases, NAND memory cells may be erased before they can be re-written with new data. Thus, for example, a used page 175 may, in some cases, not be updated until the entire block 170 that includes the page 175 has been erased.

In some examples, the memory system 110 and the host system 105 may communicate with one another (e.g., via a physical host interface) in accordance with a protocol stack that includes multiple protocol layers. An upper layer of the protocol stack may include a UFS layer and a lower layer of the protocol stack may include a physical layer. A Unipro layer may be included between the UFS layer and the physical layer, and may include a DL layer and a PA layer, among other layers. To communicate information between the host system 105 and the memory system 110 (e.g., over a communications link established in accordance with the protocol stack), the information may pass through the protocol stack at a transmitting system (e.g., one of the host system 105 or the memory system 110) from higher layers to lower layers, and subsequently pass through the protocol stack at a receiving system (e.g., the other of the host system 105 or the memory system 110) from lower layers to higher layers.

In some examples, an error may occur with a communications link established between a host system 105 and a memory system 110 in accordance with the protocol stack. For example, an error may be associated with one or more layers of the protocol stack, such as the DL layer or the PA layer. In response to the error, the memory system 110 and the host system 105 may perform a recovery procedure in an attempt to recover from the error. As one example, the memory system 110 may perform a HW reset, which may reset attributes associated with one or more protocol layers. For example, in accordance with some reset techniques, a HW reset may reset all Unipro layer attributes as well as all UFS layer attributes. Resetting UFS layer attributes may be unnecessary, however, if an error occurred at the Unipro layer (e.g., at a PA layer, at a DL layer). Thus, performing a HW reset for a Unipro error (e.g., for a PA error, for a DL error) may introduce unnecessary latency associated with resetting UFS attributes.

As described herein, a memory system 110, a host system 105, or both may reset parameters associated with a first protocol layer (e.g., Unipro layer parameters) in an attempt to recover from one or more errors while maintaining parameters associated with a second protocol layer (e.g., UFS layer parameters). For example, the host system 105 and the memory system 110 may establish a communications link. The communications link may be associated with one or more parameters of a first protocol layer and one or more parameters of a second protocol layer. In some examples, the memory system 110 or the host system 105 may detect that an error has occurred at the Unipro layer. In response to the error, the host system 105 may transmit an indication to the memory system 110 to reset the communications link. The memory system 110, or the host system 105, or both may reset the one or more parameters associated with the first protocol layer and perform an LSS in an attempt to reestablish the communications link. During such recovery procedure, the one or more parameters of the second protocol layer may be maintained, resulting in reduced latency compared to performing a HW reset.

The system 100 may include any quantity of non-transitory computer readable media that support reset techniques for protocol layers of a memory system. For example, the host system 105 (e.g., a host system controller 106), the memory system 110 (e.g., a memory system controller 115), or a memory device 130 (e.g., a local controller 135) may include or otherwise may access one or more non-transitory computer readable media storing instructions (e.g., firmware, logic, code) for performing the functions ascribed herein to the host system 105, the memory system 110, or a memory device 130. For example, such instructions, if executed by the host system 105 (e.g., by a host system controller 106), by the memory system 110 (e.g., by a memory system controller 115), or by a memory device 130 (e.g., by a local controller 135), may cause the host system 105, the memory system 110, or the memory device 130 to perform associated functions as described herein.

Figure 2:
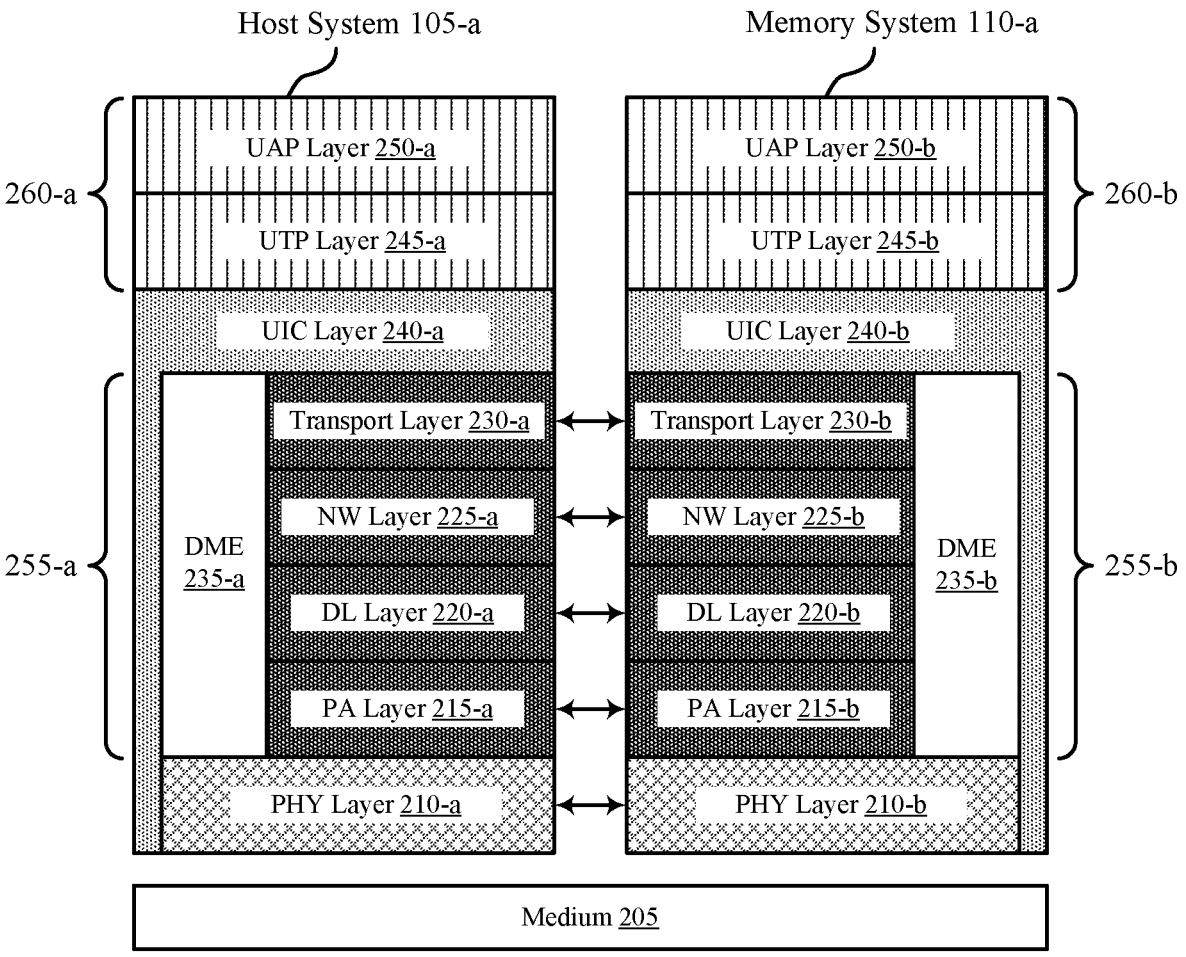
FIG. 2 illustrates an example of a protocol architecture that supports reset techniques for protocol layers of a memory system in accordance with examples as disclosed herein.

FIG. 2 illustrates an example of a protocol architecture 200 that supports reset techniques for protocol layers of a memory system in accordance with examples as disclosed herein. The protocol architecture 200 may be implemented by aspects of the system 100. For example, the protocol architecture 200 may be implemented by a host system 105-*a* and a memory system 110-*a*, which may be examples of a host system 105 and a memory system 110 as described with reference to FIG. 1.

In some examples, the memory system 110-*a* and the host system 105-*a* may be examples of UFS devices and may communicate with one another using a UFS architecture. The UFS architecture may include three major layers at each of the host system 105-*a* and the memory system 110-*a*. For example, the UFS architecture may include a physical (PHY) layer 210 (e.g., a relatively low protocol layer), a Unipro layer 255, and a UFS layer 260 (e.g., a universal flash storage layer, a relatively high protocol layer). The Unipro layer 255 and the UFS layer 260 may include two or more other layers (e.g., sublayers). For example, the Unipro layer 255 may include a PA layer 215, a DL layer 220, a network (NW) layer 225, and a transport layer 230, and the UFS layer 260 may include a UFS transport protocol (UTP) layer 245 and a UFS application (UAP) layer 250. In some examples, at least a portion of a UIC layer 240 may be considered to be a portion (e.g., a sub-layer) of a UFS layer 260. Additionally, or alternatively, in some examples, at least a portion of a Unipro layer 255 may be considered to be a portion (e.g., a sub-layer) of a UFS layer 260.

The UAP layer 250 (e.g., the UAP layer 250-*a* at the host system 105-*a* or the UAP layer 250-*b* at the memory system 110-*a*) may include a UFS command set (UCS), a device manager and a task manager. The UCS may handle commands such as read commands or write commands. The task manager may handle commands associated with command queue control and the device manager may provide device-level control such as Query Request and lower level link-layer control. The UTP Layer 245 (e.g., the UTP layer 245-*a* at the host system 105-*a* or the UTP layer 245-*b* at the memory system 110-*a*) may provide services for the higher layers. The services may include performing device-level management, transporting commands, or transporting task-management functions. The UFS Interconnect (UIC) Layer 240 (e.g., the UIC layer 240-*a* at the host system 105-*a* or the UIC layer 240-*b* at the memory system 110-*a*) may handle the connection between the host system 105-*a* and the memory system 110-*a* and may include the Unipro Pro Layer 255.

To transmit information (e.g., data, control information, protocol information) to the memory system 110-*a*, the host system 105-*a* may pass the information through the Unipro layers 255-*a* of the host system 105-*a*. Similarly, to receive the information from the host system 105-*a*, the memory system 110-*a* may pass the information through Unipro layers 255-*b* of the memory system 110-*a*. For example, if an application at the host system 105-*a* sends information to an application at the memory system 110-*a*, the information may pass to the transport layer 230-*a*. The transport layer 230 may perform functions such as addressing, segmentation and reassembly, segment composition/decomposition, segment format recognition, connections, and end-to-end flow-control, among other functions. The host system 105-*a* may pass the information from the transport layer 230-*a* to the NW layer 225-*a*. The NW layer 225-*a* may perform functions such as addressing, packet composition/decomposition, packet format recognition, and error handling, among other functions.

The host system 105-*a* may then pass the information from the NW layer 225-*a* to the DL layer 220-*a*. The DL layer 220-*a* may perform functions such as frame composition/decomposition, triggering of PHY initialization, flow control, cyclic redundancy check (CRC) generation/verification, and error detection, among other functions. The host system 105-*a* may then pass the information from the DL layer 220-*a* to the PA Layer 215-*a*. The PA Layer 215-*a* may perform functions such as transmission/reception of DL Layer control or information symbols, lane distribution, provision of Unipro power management operating modes, (re-)initialization of the PHY transmit path, and access to all PHY attributes, among other functions. The host system 105-*a* may then pass the information from the PA layer 215-*a* to the PHY Layer 210-*a*. The PHY layer 210-*a* may communicate the information to the PHY layer 210-*b* of the memory system 110-*a* via the medium 205 (e.g., a wire, a trace, a communicative signal path). In response to receiving the information at the PHY layer 210-*b*, the memory system 110-*a* may pass the information through the Unipro layers 255-*b* of the memory system 110-*a* in a reverse order (e.g., PA layer 215-*b* to DL layer 220-*b* to NW layer 225-*b* to Transport Layer 230-*b*).

In some examples, one or more errors may occur in response to passing the information the through the Unipro layers 255. Specifically, the one or more errors may occur in response to passing through the DL layer 220 or the PA layer 215. DL errors may include a failure to receive a frame (e.g., reception of a NAC frame or a timer expiring prior to receiving acknowledgment), a failure of an automatic frequency control (AFC) transmission, an error detected on the receive link (e.g., CRC error, receive buffer overflow error, wrong sequence number error, AFC frame syntax error, EOF syntax error, NAC frame syntax, bad control symbol type), or a failure to (re-)initialize the PHY layer 210, among other errors. PA errors may include bad PHY symbol error, an unmapped PHY symbol error, an unexpected PHY symbol error, or a bad PA parameter error, among other errors.

In some examples, the memory system 110-*a* and the host system 105-*a* may operate in accordance with one of a high speed (HS) mode or a low speed (LS) mode. An HS mode may allow the memory system 110-*a* and the host system 105-*a* to communicate a higher throughput of information over the medium 205 for a given time period of time compared to operating in an LS mode. For example, HS mode may support transmission in a rate of gigabits per second (Gbps) and IS mode may support transmission in a rate of megabits per second (Mbps). The memory system 110-*a* or the host system 105-*a* may use a pulse-width-modulation (PWM) signaling scheme while operating in IS mode and an HS burst while operating in HS mode. In some examples, the memory system 110-*a* or the host system 105-*a* may experience more PA errors or DL errors while operating in the HS mode than while operating in the IS mode.

To recover from a PA error or a DL error, the memory system 110-*a*, the host system 105-*a*, or both may perform one or more stages of recovery (e.g., otherwise known as (re)-initialization). In some examples, the PA layer 215 may perform the one or more stages of recovery. During one of the stages of recovery, the PA layer 215 of the memory system 110-*a* or the host system 115-*a* may issue a line reset (e.g., LIN-RESET) command to the PHY layer 210 and the PHY layer 210 may reset the communications link between the memory system 110-*a* and the host system 105-*a* to a PWM signaling scheme (e.g., PWM-GI). While operating according to the PWM signaling scheme, the host system 115-*a* may transmit a power mode change request (e.g., PACP_PWR_req) to the memory system 110-*a*. The power mode change request may include a power mode configuration. The power mode configuration may include an indication of a transmission mode, of one or more transmission/reception lanes, or of a transmission/reception gear, among other indications or combinations thereof.

In response to transmitting a power mode change request, the host system 105-*a* may initiate a timer (e.g., PACP_RE-QUEST_TIMER) and wait for a power mode change response (e.g., PACP_PWR_cnf) from the memory system 110-*a*. The power mode change response may indicate whether the power mode change request was accepted and executed by the memory system 110-*a*. If the timer times out (e.g., expires) prior to the host system 105-*a* receiving the power mode change response from the memory system 110-*a*, the communications link may be considered unstable and recovery may be aborted. However, if the host system 115-*a* receives the power mode change response prior to expiration of the timer and the power mode change response indicates a successful implementation of the power mode change at the memory system 110-*a*, the communications link may be stable and the power mode may be reinitialized.

In some examples, a DL error or a PA error may occur while the memory system 110-*a* or the host system 105-*a* is operating in the HS mode. In some such examples, during recovery, the memory system 110-*a* or the host system 105-*a* may transition from the HS mode to the LS mode (e.g., in order to support the PWM signaling mode) and, if recovery is successful, the memory system 110-*a* and the host system 105-*a* may transition from the IS mode back to the HS mode. Transitioning between HS mode and LS mode may introduce unnecessary latency into the system. Further, other errors may occur, resulting in a recovery failure. For example, the host system 105-*a* and the memory system 110-*a* may attempt to (re-)initialize concurrently and wait (e.g., for 30 seconds, for 10 seconds) for a frame not expected after a line reset resulting in an error. As another example, the host system 105-*a* or the memory system 110-*a* may not detect an end of a burst noise and wait for a frame not expected after line reset resulting in an error.

If an attempt at recovery fails, the memory system 110-*a* or the host system 105-*a* may undergo a reset. The memory system 110-*a* or the host system 105-*a* may select a reset mode from a candidate set of reset modes. Table 1 illustrates candidate set of reset modes from which the memory system 110-*a* or the host system 105-*a* may select from. In some examples, the memory system 110-*a* or the host system 105-*a* may select a HW reset. As shown in Table 1, a HW reset may reset all UFS flags, UFS attributes, Unipro attributes, and logical units of a logical unit queue. In some examples, a device management entity (DME) 235 (e.g., a DME 235-*a* of the host system 105-*a* or a DME 235-*b* of the memory system 110-*a*) may be responsible for resetting the Unipro attributes. In some examples, the host system 105-*a* may initiate the HW reset and indicate the HW reset to the memory system 110-*a* using a reset signal (e.g., RST_n) via a reset pin (e.g., of the host system 105-*a*, of the memory system 110-*a*). Table 2 provides an example of reset signal parameters for signaling an HW Reset type.

TABLE 1

| | Reset Modes | | | |
|---|---|---|---|---|
| Reset Type | Unipro Stack and Attributes | Volatile and Set Only Attributes and Flags | Power on reset Attributes and Flags | Logical Unit Queue |
| Power-on | Reset | Reset | Reset | Reset (all logical units) |
| HW Reset | Reset | Reset | Reset | Reset (all logical units) |
| EndPointReset | Reset | Reset | Not Affected | Reset (all logical units) |
| LU Reset | Not affected | Not affected | Not Affected | Reset (addressed logical units) |
| Host Unipro Warm Reset | Reset | Reset | Not Affected | Reset (all logical units) |

TABLE 2

| | HW Reset Signal Parameters | | | |
|---|---|---|---|---|
| Symbol | Comment | Min | Max | Unit |
| tRSTW | RST_n Pulse Width | 1 | | μs |
| tRSTH | RST_n High Period (Interval) | 1 | | μs |
| tRSTF | RST_n filter | 100 | | ns |

Although performing the HW reset may allow the memory system 110-*a* and the host system 105-*a* to recover from a DL error or a PA error, the HW reset may reset all UFS flags, UFS attributes, Unipro attributes, and logical units of a logical unit queue. The PA error or the DL error may affect the Unipro attributes (e.g., one or more of the PHY layer attributes, the PA layer attributes, or the DL layer attributes) and may not affect the UFS flags and UFS attributes. As such, performing the HW reset in response to a DL error or a PA error may introduce unnecessary latency into the system.

As described herein, the memory system 110-*a* or the host system 105-*a* may perform a reset that results in a reset of Unipro attributes (e.g., attributes of one or more of the DL layer 220, the PA layer 215, or the PHY Layer 210) in response to detecting the PA error or the DL error. In some examples, the reset mode may be added to the candidate reset modes and, as shown by Table 3, the reset mode may be referred to as a MPHY and Unipro Warm Reset. In contrast with the other reset modes (e.g., HW Reset), the MPHY and Unipro Warm Reset may not result in a reset of UFS attributes, UFS flags, or logical units of the logical unit queue.

TABLE 3

| | Reset Modes | | | |
|---|---|---|---|---|
| Reset Type | Unipro Stack and Attributes | Volatile and Set Only Attributes and Flags | Power on reset Attributes and Flags | Logical Unit Queue |
| Power-on | Reset | Reset | Reset | Reset (all logical units) |
| HW Reset | Reset | Reset | Reset | Reset (all logical units) |
| EndPointReset | Reset | Reset | Not Affected | Reset (all logical units) |
| LU Reset | Not affected | Not affected | Not Affected | Reset (addressed logical units) |
| Host Unipro Warm Reset | Reset | Reset | Not Affected | Reset (all logical units) |
| MPHY and Unipro Warm Reset | Reset | Not Affected | Not Affected | Not Affected |

Figure 8:
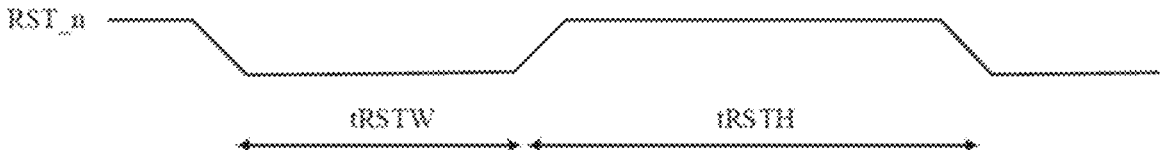
FIG. 8 illustrates an example of a waveform that supports reset techniques for protocol layers of a memory system in accordance with examples as disclosed herein.

In some examples, the memory system 110-*a* or host system 105-*a* may operate in the HS mode and detect a DL error or a PA error. In response to detecting a DL error or a PA error, the memory system 110-*a* or the host system 105-*a* may select the MPHY and Unipro Warm reset from the candidate set of reset modes. In some examples, the host system 105-*a* may initiate the MPHY and Unipro Warm reset and indicate the MPHY and Unipro Warm reset to the memory system 110-*a* using a reset signal (e.g., RST_n) via a reset pin. Table 4 provides an example of reset signal parameters for signaling an MPHY and Unipro Warm Reset type and a HW Reset type, relative to aspects of a waveform as shown in FIG. 8.

TABLE 4

| | Reset Signal Parameters | | | | |
|---|---|---|---|---|---|
| Symbol | Comment | Min | Max | Unit | Note |
| tRSTW_L | Long RST_n Pulse Width | 1 | | μs | HW Reset |
| tRSTH | RST_n High Period (Interval) | 1 | | μs | |
| tRSTF | RST_n filter | 100 | 200 | ns | |
| tRSTW_S | Short RST_n Pulse Width | 400 | 800 | ns | MPHY and Unipro Warm Reset |

In some implementations, the signaling characteristics for the MPHY and Unipro Warm Reset may be different from the signaling characteristics for the HW Reset, but may leverage a same reset pin. For example, as shown in Table 4, a minimum pulse width for the HW reset (e.g., tRSTW_L) may be 1 us and, for the MPHY and Unipro Warm reset (e.g., tRSTW_S), a minimum pulse with may be 400 ns and a maximum pulse width may be 800 ns.

During the MPHY and Unipro Warm reset, the DME 235 may reset one or more layers of the Unipro stack to an initial condition. For example, the DME 235 may reset one or more protocol state machines, one or more timers, or one or more attributes to of the one or more Unipro layers 255 to a reset state. Additionally, the DME 235 may clear one or more data buffers of the one or more Unipro layers 255. Resetting the one or more layers of the Unipro stack may allow the memory system 110-a and the host system 105-a to recover from the PA error or the DI, error.

Concurrent with or after the DME 235 resets the one or more layers of the Unipro stack, the PA layer 215 may perform a link startup sequence (LSS). The LSS may be described as a multi-phase handshake, which may exchange Unipro trigger events to establish the communications link between the host system 105-a and the memory system 110-a. In some examples, the communications link may be disabled after the DME 235 resets the one or more layers of the Unipro stack and is enabled in part by the LSS. Because the memory system 110-a and the host system 105-a may be operating in the HS mode, the PA layer 215 may perform HS LSS (HS-LSS), which may allow the PA layer 215 to perform LSS in HS gear 1 (e.g., as opposed to using PWM signaling). In response to performing the LSS, the communications link between the memory system 110-a and the host system 105-a may be operable allowing for communication between the memory system 110-a and the host system 105-a The MPHY and Unipro Warm reset may allow the memory system 110-a or the host system 105-a to recover from a PA error or a DL error by resetting one or more Unipro layers 255 without resetting one or more of the UFS layers 260 (e.g., maintaining the parameters of the UFS layer 260, such as UFS attributes and UFS flags) which may save time compared to performing a HW reset which results in a reset of the Unipro layer 255 and the UFS layer 260. Further, performing the MPHY and Unipro Warm reset may allow the memory system 110-a to stay in an HS mode which may save time compared to transitioning between an HS mode and an LS mode as described with respect to the (re-) initialization procedure.

Figure 3:
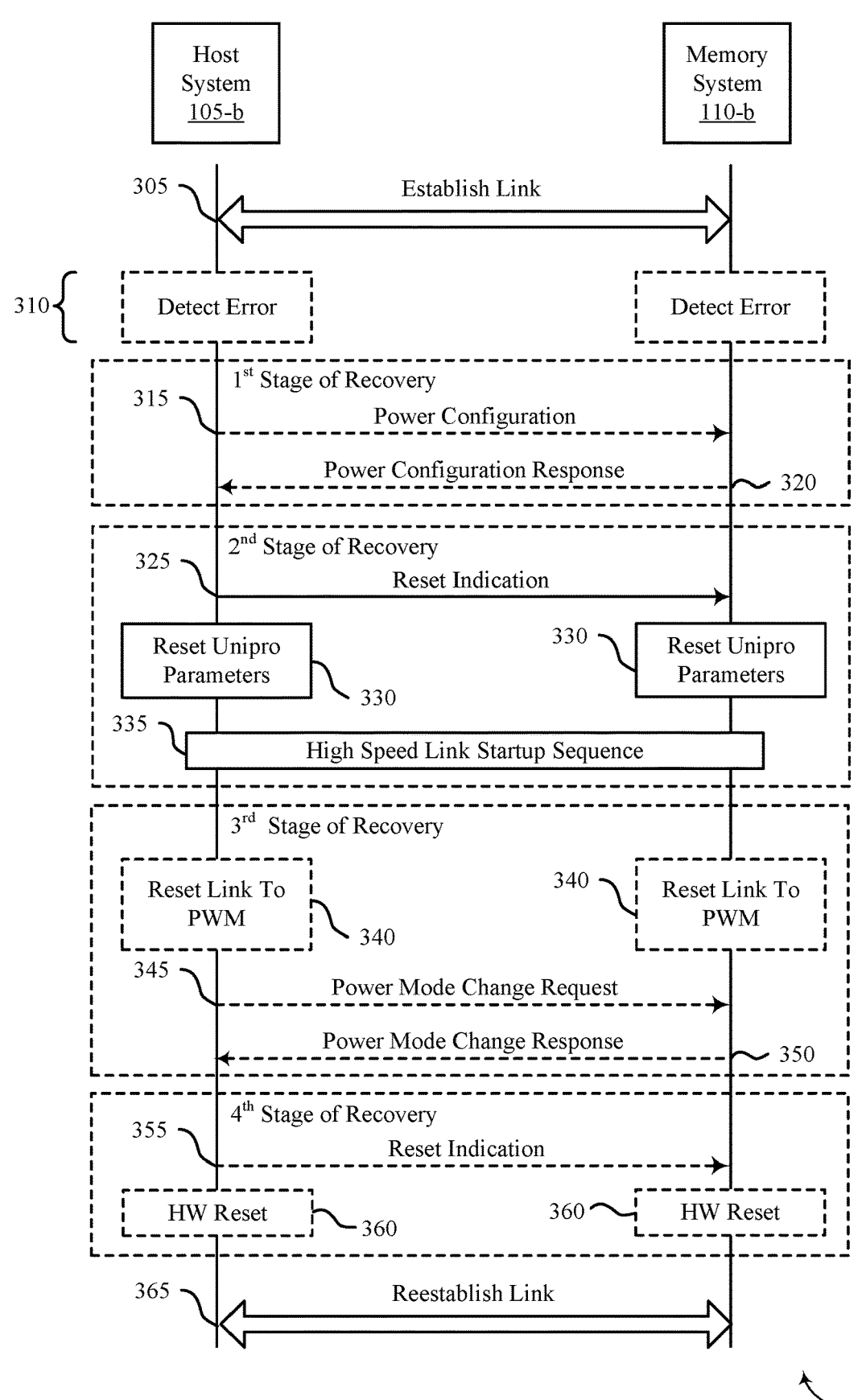
FIG. 3 illustrates an example of a process flow that supports reset techniques for protocol layers of a memory system in accordance with examples as disclosed herein.

FIG. 3 illustrates an example of a process flow 300 that supports reset techniques for protocol layers of a memory system in accordance with examples as disclosed herein. In some examples, the process flow 300 may implement, or be implemented by, a host system 105-b and a memory system 110-b which may be an example of a host system 105 and a memory system 110 as described with reference to FIGS. 1 and 2. In some examples, the host system 105-b and the memory system 110-b may be coupled via an interface (e.g., an interface in accordance with a design configuration or memory standard, such as UFS standard, which may be associated with a protocol stack including multiple protocol layers). Alternative examples of the following may be implemented, where some steps are performed in a different order than described or are not performed at all. In some cases, steps may include additional features not mentioned below, or further steps may be added.

At 305, the host system 105-b and the memory system 110-b may establish a communications link between the host system 105-b and the memory system 110-b. The communications link may be based on one or more first parameters associated with a first protocol layer and one or more second parameters associated with a second protocol layer. The first protocol layer may include a Unipro layer and the second protocol layer may include a UFS layer (e.g., one or both of a UTP layer or a UAP layer).

At 310, the host system 105-b, or the memory system 110-b, or both may detect an error associated with the first protocol layer. The error may include one or more of a CRC error, a receive buffer overload error, a wrong frame sequence number error, an AFC frame syntax error, a frame syntax error, an EOF syntax error, a bad control symbol type error, a bad PHY symbol error, an unmapped PHY symbol error, an unexpected PHY symbol error, or a bad PA parameter error. In some examples, if the error is detected at the memory system 110-b, the memory system 110-b may transmit an indication of the detected error to the host system 105-b.

In some examples, in response to detecting the error at 310, the host system 105-b or the memory system 110-b may undergo one or more stages of recovery (e.g., a 1st stage of recovery, a 2nd stage of recovery, a 3rd stage of recovery, or a 4th stage of recovery, or a combination thereof, such as a sequence thereof). In some examples, the host system 105-b or the memory system 110-b may move from one stage of recovery to a different stage of recovery in the event that recovery has failed after completion of the previous stage of recovery. In some examples of implementing the techniques of the process flow 300, the memory system 110-b or the host system 105-b may go through the stages of recovery in sequential order or from the 1st stage of recovery to the 2nd stage of recovery to the 3rd stage of recovery to the 4th stage of recovery. In some other examples of implementing the techniques of the process flow 300, the memory system 110-b or the host system 105-b may select or determine to perform a stage or a combination of stages of recovery (e.g., instead of another stage of recovery, based on a type of error or an operating mode of the memory system 110-b or the host system 105-b, such as whether to attempt recovery in an HS mode versus an LS mode). For example, before or after completion of the 1st stage of recovery (e.g., in the event that the 1st stage of recovery failed), the memory system 110-b or the host system 105-b may select to perform either the 2nd stage of recovery (e.g., in an HS mode) or the 3rd stage of recovery (e.g., in a LS mode), which may include not being configured to attempt both the 2nd stage of recovery and the 3rd stage of recovery.

During the 1st stage of recovery and at 315, the host system 105-b may transmit an indication of a power configuration to the memory system 110-b. The power configuration may include a power configuration used prior to performing the 1st stage of recovery. In response to transmitting the indication of the power configuration, the host system 105-b may initiate a timer. In some examples, at 320 (e.g., in response to the indication of the power configuration), the memory system 110-b may transmit a power configuration response that indicates that the memory system 110-b successfully implemented the power configuration. In some such examples, the memory system 110-b and the host system 105-b may reestablish the communications link at 365 (e.g., in accordance with the 1st stage of recovery, without performing other stages of recovery). In some other such examples, the host system 105-b may not receive the power configuration response from the memory system 110-b prior to expiration of the timer. Thus, in some examples, the memory system 110-b and the host system 105-b may not reestablish the communications link and the memory system 110-b and the host system 105-b may perform the 2nd stage of recovery, the 3rd stage of recovery (e.g., with or without attempting the 2nd stage of recovery), or the 4th stage of recovery (e.g., depending on a configuration at the host system 105-b or at the memory system 110-b, depending on one or more reset indications from the host system 105-b to the memory system 110-b).

During the 2nd stage of recovery and at 325, the host system 105-b may transmit, to the memory system 110-b, an indication to reset (e.g., according to a reset mode) the communications link. In some examples, the indication may be associated with a first pulse width (e.g., of signaling via a reset pin). In some examples, the host system 105-*b* may select the reset mode from a set of reset modes in response to the detected error. At 330, the host system 105-*b* and the memory system 110-*b* may reset the one or more first parameters associated with the first protocol layer. For example, the host system 105-*b*, or the memory system 110-*b*, or both may reset one or more protocol state machines associated with the first protocol layer, reset one or more timers associated with the first protocol layer, or clear one or more data buffers associated with the first protocol layer. In some examples, the host system 105-*b* may transmit signaling instructing the memory system 110-*b* to reset the one or more first parameters. Further, the memory system 110-*b* and the host system 105-*b* may maintain the one or more second parameters associated with the second protocol layer. For example, the memory system 110-*b* and the host system 105-*b* may maintain one or more attributes associated with the second protocol layer, maintain one or more flags associated with the second protocol layer, or maintain a logical unit queue associated with a second protocol layer.

At 335, the host system 105-*b* and the memory system 110-*b* may perform an LSS and, in some examples, may reestablish the communications link at 365 in response (e.g., in accordance with the 2nd stage of recovery, without performing other stages of recovery). In some examples, to perform the LSS at 335, the host system 105-*b* and the memory system 110-*b* may operate according to an HS mode and perform an HS-LSS. If the memory system 110-*b* and the host system 105-*b* are unable to reestablish the communications link, the memory system 110-*b* and the host system 105-*b* may perform the 3rd stage of recovery or the 4th stage of recovery (e.g., omitting an attempt of the 3rd stage of recovery).

During the 3rd stage of recovery and at 340, the memory system 110-*b* and the host system 105-*b* may transition the communications link from HS link to a PWM link, which may be associated with the host system 105-*b* and the memory system 110-*b* performing a low-speed link startup sequence. In some examples, the operations of 340 may be initiated by a reset indication, such as the reset indication of 325 or a different reset indication (e.g., not shown, an indication to perform the 3rd stage of recovery, which may be in addition to or instead of the indication of 325), or may be initiated based on a failed attempt of the 2nd stage of recovery, or the 1st stage of recovery, or both. At 345, the host system 105-*b* may transmit a power configuration to the memory system 110-*b*. In response to transmitting the power configuration, the host system 105-*b* may initiate a timer. In some examples, at 350 and in response to the power configuration, the memory system 110-*b* may transmit a power configuration response that indicates that the memory system 110-*b* successfully implemented the power configuration. In some such examples, the memory system 110-*b* and the host system 105-*b* may reestablish the communications link at 365 (e.g., in accordance with the 3rd stage of recovery, without performing other stages of recovery). In some other such examples, the host system 105-*b* may not receive the power configuration response from the memory system 110-*b* prior to expiration of timer. In such examples, the memory system 110-*b* and the host system 105-*b* may not reestablish the communications link and the memory system 110-*b* and the host system 105-*b* may perform a 4th stage of recovery.

During the 4th stage of recovery and at 355, the memory system 110-*b* and the host system 105-*b* may transmit an indication to reset (e.g., according to a second reset mode)

the communications link. In some examples, the indication may be associated with a second pulse width (e.g., of signaling via a reset pin). At 360, the host system 105-*b* and the memory system 110-*b* may perform a HW reset. The HW reset may include resetting the one or more first parameters associated with the first protocol layer and the one or more second parameters associated with the second protocol layer, and the host system 105-*b* and the memory system 110-*b* may reestablish a communications link at 365 (e.g., in accordance with the 4th stage of recovery).

Figure 4:
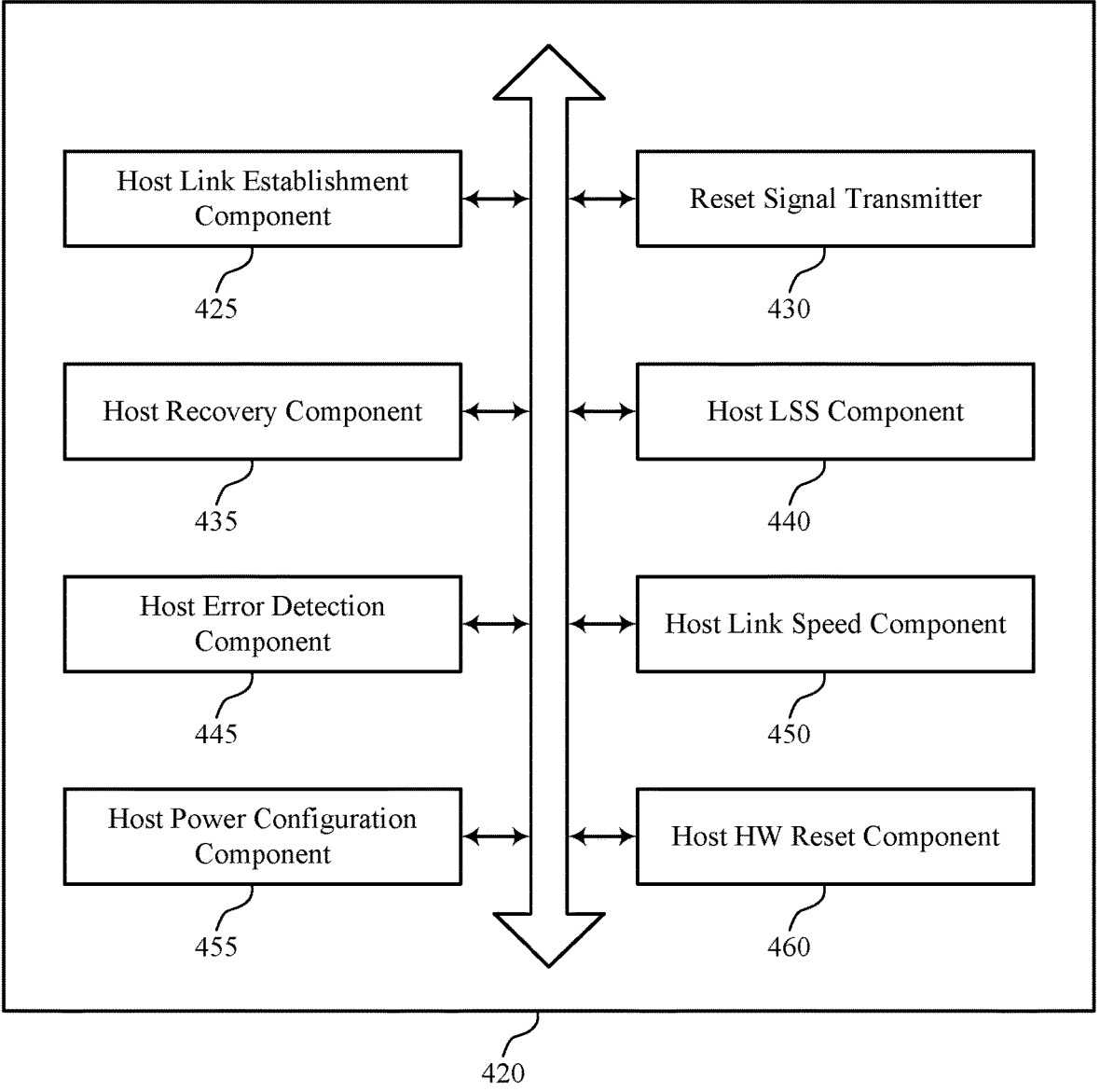
FIGS. 4 and 5 illustrate block diagrams of a host system and a memory system, respectively, that support reset techniques for protocol layers of a memory system in accordance with examples as disclosed herein.

FIG. 4 illustrates a block diagram 400 of a host system 420 that supports reset techniques for protocol layers of a memory system in accordance with examples as disclosed herein. The host system 420 may be an example of aspects of a host system as described with reference to FIGS. 1 through 3. The host system 420, or various components thereof, may be an example of means for performing various aspects of reset techniques for protocol layers of a memory system as described herein. For example, the host system 420 may include a host link establishment component 425, a reset signal transmitter 430, a host recovery component 435, a host LSS component 440, a host error detection component 445, a host link speed component 450, a host power configuration component 455, a host HW reset component 460, or any combination thereof. Each of these components may communicate, directly or indirectly, with one another (e.g., via one or more buses).

The host link establishment component 425 may be configured as or otherwise support a means for establishing a communications link between a host system and a memory system, the communications link based at least in part on one or more first parameters associated with a first protocol layer and one or more second parameters associated with a second protocol layer. The reset signal transmitter 430 may be configured as or otherwise support a means for transmitting, by the host system, an indication to reset the communications link. The host recovery component 435 may be configured as or otherwise support a means for resetting the one or more first parameters associated with the first protocol layer based at least in part on transmitting the indication to reset the communications link. The host LSS component 440 may be configured as or otherwise support a means for attempting to reestablish the communications link between the host system and the memory system based at least in part on resetting the one or more first parameters associated with the first protocol layer and maintaining the one or more second parameters associated with the second protocol layer.

In some examples, to support resetting the one or more first parameters associated with the first protocol layer, the host recovery component 435 may be configured as or otherwise support a means for resetting one or more protocol state machines associated with the first protocol layer, resetting one or more timers associated with the first protocol layer, resetting one or more attributes associated with the first protocol layer, clearing one or more data buffers associated with the first protocol layer, or a combination thereof.

In some examples, the host recovery component 435 may be configured as or otherwise support a means for transmitting a signal instructing the memory system to reset the one or more protocol state machines, reset the one or more timers, reset the one or more attributes, clear the one or more data buffers, or a combination thereof.

In some examples, to support maintaining the one or more second parameters associated with the second protocol layer, the host recovery component 435 may be configured as or otherwise support a means for maintaining one or more attributes associated with the second protocol layer, maintaining one or more flags associated with the second protocol layer, maintaining a logical unit queue associated with the second protocol layer, or a combination thereof.

In some examples, the first protocol layer includes a Unipro layer, or a PHY layer, or a combination thereof and the second protocol layer includes a UFS transport layer, a UFS application layer, or a combination thereof.

In some examples, to support reestablishing the communications link, the host LSS component 440 may be configured as or otherwise support a means for performing, while the host system is operating in accordance with an HIS mode, an HS-LSS. In some examples, resetting the one or more first parameters associated with the first protocol layer occurs during at least a portion of performing the HS-LSS.

In some examples, the host recovery component 435 may be configured as or otherwise support a means for resetting one or more third parameters associated with a third protocol layer based at least in part on transmitting the indication to reset the communications link, where attempting to reestablish the communications link is based at least in part on resetting the one or more first parameters associated with the first protocol layer and resetting the one or more third parameters associated with the third protocol layer.

In some examples, the host error detection component 445 may be configured as or otherwise support a means for detecting, at the host system, an error associated with the first protocol layer, where transmitting the indication to reset the communications link is based at least in part on detecting the error.

In some examples, the reset signal transmitter 430 may be configured as or otherwise support a means for selecting, at the host system, a reset mode from a plurality of reset modes based at least in part on the detected error, where the indication to reset the communications link is based at least in part on the selected reset mode.

In some examples, the detected error includes a CRC error, a receive buffer overload error, a wrong frame sequence number error, an AFC frame syntax error, a frame syntax error, an EOF syntax error, a bad control symbol type error, a bad PHY symbol error, an unmapped PHY symbol error, an unexpected PHY symbol error, a bad PA parameter error, or a combination thereof.

In some examples, the host link speed component 450 may be configured as or otherwise support a means for transitioning the communications link from an HS link to a PWM link based at least in part on failing to reestablish the communications link based at least in part on resetting the one or more first parameters associated with the first protocol layer and maintaining the one or more second parameters associated with the second protocol layer, and based at least in part on performing a line reset operation. In some examples, the host power configuration component 455 may be configured as or otherwise support a means for receiving, while the host system is operating according to a PWM mode, a power configuration associated with the communications link. In some examples, the host link establishment component 425 may be configured as or otherwise support a means for attempting to reestablish the communications link based at least in part on receiving the power configuration. In some examples, the host link speed component 450) may be configured as or otherwise support a means for transitioning the communications link from the PWM link to the HS link based at least in part on reestablishing the communications link.

In some examples, the host HW reset component 460 may be configured as or otherwise support a means for performing a HW reset based at least part on failing to reestablish the communications link based at least in part on resetting the one or more first parameters associated with the first protocol layer and maintaining the one or more second parameters associated with the second protocol layer. In some examples, the host LSS component 440 may be configured as or otherwise support a means for attempting to reestablish the communications link based at least in part on performing the HW reset.

In some examples, the indication to reset the communications link is associated with a first pulse width, and the reset signal transmitter 430 may be configured as or otherwise support a means for transmitting a second indication to reset the communications link based at least in part on failing to reestablish the communications link, based at least in part on resetting the one or more first parameters associated with the first protocol layer and maintaining the one or more second parameters associated with the second protocol layer, the second indication to reset the communications link associated with a second pulse width that is different than the first pulse width, where performing the HW reset is based at least in part on transmitting the second indication.

Figure 5:
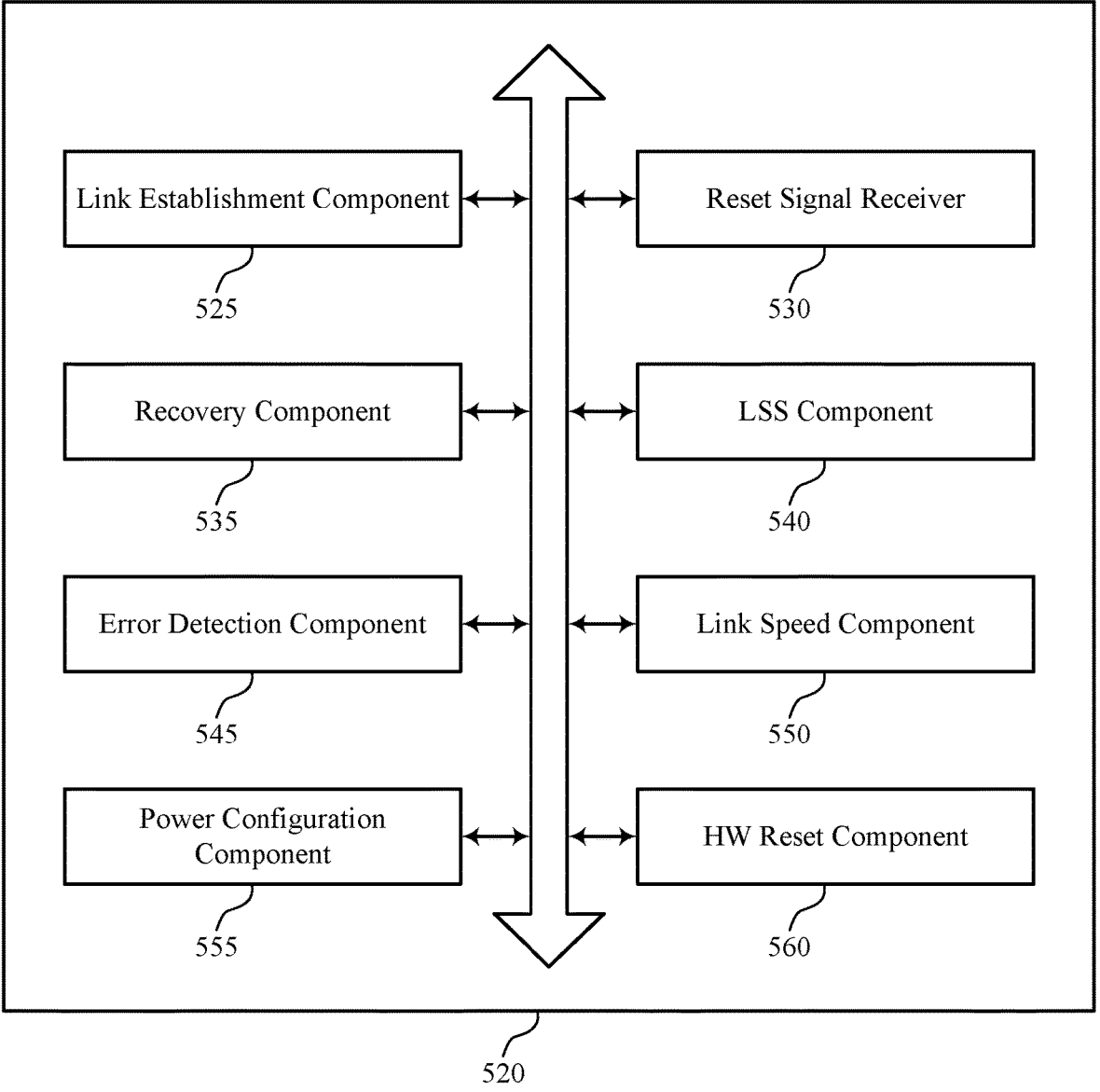

FIG. 5 illustrates a block diagram 500 of a memory system 520 that supports reset techniques for protocol layers of a memory system in accordance with examples as disclosed herein. The memory system 520 may be an example of aspects of a memory system as described with reference to FIGS. 1 through 3. The memory system 520, or various components thereof, may be an example of means for performing various aspects of reset techniques for protocol layers of a memory system as described herein. For example, the memory system 520 may include a link establishment component 525, a reset signal receiver 530, a recovery component 535, an LSS component 540, an error detection component 545, a link speed component 550, a power configuration component 555, an HW reset component 560, or any combination thereof. Each of these components may communicate, directly or indirectly, with one another (e.g., via one or more buses).

The link establishment component 525 may be configured as or otherwise support a means for establishing a communications link between a host system and a memory system, the communications link based at least in part on one or more first parameters associated with a first protocol layer and one or more second parameters associated with a second protocol layer. The reset signal receiver 530 may be configured as or otherwise support a means for receiving, by the memory system, an indication to reset the communications link. The recovery component 535 may be configured as or otherwise support a means for resetting the one or more first parameters associated with the first protocol layer based at least in part on receiving the indication to reset the communications link. The LSS component 540 may be configured as or otherwise support a means for attempting to reestablish the communications link between the host system and the memory system based at least in part on resetting the one or more first parameters associated with the first protocol layer and maintaining the one or more second parameters associated with the second protocol layer.

In some examples, to support resetting the one or more first parameters associated with the first protocol layer, the recovery component 535 may be configured as or otherwise support a means for resetting one or more protocol state machines, resetting one or more timers, resetting one or more attributes, clearing one or more data buffers, or a combination thereof.

In some examples, to support maintaining the one or more second parameters associated with the second protocol layer, the recovery component 535 may be configured as or otherwise support a means for maintaining one or more attributes associated with the second protocol layer, maintaining one or more flags associated with the second protocol layer, maintaining a logical unit queue associated with the second protocol layer, or a combination thereof.

In some examples, the first protocol layer includes a Unipro layer, or a PHY layer, or a combination thereof and the second protocol layer includes a UFS transport layer, a UFS application layer, or a combination thereof.

In some examples, to support reestablishing the communications link, the LSS component 540 may be configured as or otherwise support a means for performing, while the memory system is operating in accordance with an HS mode, an HS-LSS. In some examples, resetting the one or more first parameters associated with the first protocol layer occurs during at least a portion of performing the HS-LSS.

In some examples, the recovery component 535 may be configured as or otherwise support a means for resetting one or more third parameters associated with a third protocol layer based at least in part on receiving the indication to reset the communications link, where attempting to reestablish the communications link is based at least in part on resetting the one or more first parameters associated with the first protocol layer and resetting the one or more third parameters associated with the third protocol layer.

In some examples, the error detection component 545 may be configured as or otherwise support a means for detecting an error associated with the first protocol layer. In some examples, the error detection component 545 may be configured as or otherwise support a means for transmitting an indication of the detected error, where receiving the indication to reset the communications link is based at least in part on transmitting the indication of the detected error.

In some examples, the link speed component 550 may be configured as or otherwise support a means for transitioning the communications link from an HS link to a PWM link based at least in part on failing to reestablish the communications link based at least in part on resetting the one or more first parameters associated with the first protocol layer and maintaining the one or more second parameters associated with the second protocol layer, and based at least in part on performing a line reset operation. In some examples, the power configuration component 555 may be configured as or otherwise support a means for transmitting, while the memory system is operating according to a PWM mode, a power configuration associated with the communications link. In some examples, the link establishment component 525 may be configured as or otherwise support a means for reestablishing the communications link based at least in part on transmitting the power configuration. In some examples, the link speed component 550 may be configured as or otherwise support a means for transitioning the communications link from the PWM link to the HS link based at least in part on reestablishing the communications link.

In some examples, the HW reset component 560 may be configured as or otherwise support a means for performing a HW reset based at least part on failing to reestablish the communications link based at least in part on one or more first parameters associated with a first protocol layer and one or more second parameters associated with a second protocol layer. In some examples, the LSS component 540 may be configured as or otherwise support a means for attempting to reestablish the communications link based at least in part on performing the HW reset.

In some examples, the indication to reset the communications link is associated with a first pulse width, and the reset signal receiver 530 may be configured as or otherwise support a means for receiving a second indication to reset the communications link based at least in part on failing to reestablish the communications link based at least in part on one or more first parameters associated with a first protocol layer and one or more second parameters associated with a second protocol layer, the second indication associated with a second pulse width that is different than the first pulse width, where performing the HW reset is based at least in part on receiving the second indication.

FIG. 6 illustrates a flowchart showing a method 600 that supports reset techniques for protocol layers of a memory system in accordance with examples as disclosed herein. The operations of method 600 may be implemented by a host system or its components as described herein. For example, the operations of method 600 may be performed by a host system as described with reference to FIGS. 1 through 4. In some examples, a host system may execute a set of instructions to control the functional elements of the device to perform the described functions. Additionally, or alternatively, the host system may perform aspects of the described functions using special-purpose hardware.

At 605, the method may include establishing a communications link between a host system and a memory system, the communications link based at least in part on one or more first parameters associated with a first protocol layer and one or more second parameters associated with a second protocol layer. The operations of 605 may be performed in accordance with examples as disclosed herein. In some examples, aspects of the operations of 605 may be performed by a host link establishment component 425 as described with reference to FIG. 4.

At 610, the method may include transmitting, by the host system, an indication to reset the communications link. The operations of 610 may be performed in accordance with examples as disclosed herein. In some examples, aspects of the operations of 610 may be performed by a reset signal transmitter 430 as described with reference to FIG. 4.

At 615, the method may include resetting the one or more first parameters associated with the first protocol layer based at least in part on transmitting the indication to reset the communications link. The operations of 615 may be performed in accordance with examples as disclosed herein. In some examples, aspects of the operations of 615 may be performed by a host recovery component 435 as described with reference to FIG. 4.

At 620, the method may include attempting to reestablish the communications link between the host system and the memory system based at least in part on resetting the one or more first parameters associated with the first protocol layer and maintaining the one or more second parameters associated with the second protocol layer. The operations of 620 may be performed in accordance with examples as disclosed herein. In some examples, aspects of the operations of 620 may be performed by a host LSS component 440 as described with reference to FIG. 4.

In some examples, an apparatus as described herein may perform a method or methods, such as the method 600. The apparatus may include features, circuitry, logic, means, or instructions (e.g., a non-transitory computer-readable medium storing instructions executable by a processor), or any combination thereof for performing the following aspects of the present disclosure:

Aspect 1: A method, apparatus, or non-transitory computer-readable medium including operations, features, circuitry, logic, means, or instructions, or any combination thereof for establishing a communications link between a host system and a memory system, the communications link based at least in part on one or more first parameters associated with a first protocol layer and one or more second parameters associated with a second protocol layer; transmitting, by the host system, an indication to reset the communications link; resetting the one or more first parameters associated with the first protocol layer based at least in part on transmitting the indication to reset the communications link; and attempting to reestablish the communications link between the host system and the memory system based at least in part on resetting the one or more first parameters associated with the first protocol layer and maintaining the one or more second parameters associated with the second protocol layer.

Aspect 2: The method, apparatus, or non-transitory computer-readable medium of aspect 1, where resetting the one or more first parameters associated with the first protocol layer includes operations, features, circuitry, logic, means, or instructions, or any combination thereof for resetting one or more protocol state machines associated with the first protocol layer, resetting one or more timers associated with the first protocol layer, resetting one or more attributes associated with the first protocol layer, clearing one or more data buffers associated with the first protocol layer, or a combination thereof.

Aspect 3: The method, apparatus, or non-transitory computer-readable medium of aspect 2, further including operations, features, circuitry, logic, means, or instructions, or any combination thereof for transmitting a signal instructing the memory system to reset the one or more protocol state machines, reset the one or more timers, reset the one or more attributes, clear the one or more data buffers, or a combination thereof.

Aspect 4: The method, apparatus, or non-transitory computer-readable medium of any of aspects 1 through 3, where maintaining the one or more second parameters associated with the second protocol layer includes operations, features, circuitry, logic, means, or instructions, or any combination thereof for maintaining one or more attributes associated with the second protocol layer, maintaining one or more flags associated with the second protocol layer, maintaining a logical unit queue associated with the second protocol layer, or a combination thereof.

Aspect 5: The method, apparatus, or non-transitory computer-readable medium of any of aspects 1 through 4, where the first protocol layer includes a Unipro layer, or a PHY layer, or a combination thereof and the second protocol layer includes a UFS transport layer, a UFS application layer, or a combination thereof.

Aspect 6: The method, apparatus, or non-transitory computer-readable medium of any of aspects 1 through 5, where reestablishing the communications link includes operations, features, circuitry, logic, means, or instructions, or any combination thereof for performing, while the host system is operating in accordance with an HIS mode, an HS-LSS.

Aspect 7: The method, apparatus, or non-transitory computer-readable medium of aspect 6, where resetting the one or more first parameters associated with the first protocol layer occurs during at least a portion of performing the HS-LSS.

Aspect 8: The method, apparatus, or non-transitory computer-readable medium of any of aspects 1 through 7, further including operations, features, circuitry, logic, means, or instructions, or any combination thereof for resetting one or more third parameters associated with a third protocol layer based at least in part on transmitting the indication to reset the communications link, where attempting to reestablish the communications link is based at least in part on resetting the one or more first parameters associated with the first protocol layer and resetting the one or more third parameters associated with the third protocol layer.

Aspect 9: The method, apparatus, or non-transitory computer-readable medium of any of aspects 1 through 8, further including operations, features, circuitry, logic, means, or instructions, or any combination thereof for detecting, at the host system, an error associated with the first protocol layer, where transmitting the indication to reset the communications link is based at least in part on detecting the error.

Aspect 10: The method, apparatus, or non-transitory computer-readable medium of aspect 9, further including operations, features, circuitry, logic, means, or instructions, or any combination thereof for selecting, at the host system, a reset mode from a plurality of reset modes based at least in part on the detected error, where the indication to reset the communications link is based at least in part on the selected reset mode.

Aspect 11: The method, apparatus, or non-transitory computer-readable medium of any of aspects 9 through 10, where the detected error includes a CRC error, a receive buffer overload error, a wrong frame sequence number error, an AFC frame syntax error, a frame syntax error, an HOF syntax error, a bad control symbol type error, a bad PHY symbol error, an unmapped PHY symbol error, an unexpected PHY symbol error, a bad PA parameter error, or a combination thereof.

Aspect 12: The method, apparatus, or non-transitory computer-readable medium of any of aspects 1 through 11, further including operations, features, circuitry, logic, means, or instructions, or any combination thereof for transitioning the communications link from an HS link to a PWM link based at least in part on failing to reestablish the communications link based at least in part on resetting the one or more first parameters associated with the first protocol layer and maintaining the one or more second parameters associated with the second protocol layer, and based at least in part on performing a line reset operation: receiving, while the host system is operating according to a PWM mode, a power configuration associated with the communications link; attempting to reestablish the communications link based at least in part on receiving the power configuration; and transitioning the communications link from the PWM link to the HS link based at least in part on reestablishing the communications link.

Aspect 13: The method, apparatus, or non-transitory computer-readable medium of any of aspects 1 through 12, further including operations, features, circuitry, logic, means, or instructions, or any combination thereof for performing a HW reset based at least part on failing to reestablish the communications link based at least in part on resetting the one or more first parameters associated with the first protocol layer and maintaining the one or more second parameters associated with the second protocol layer and attempting to reestablish the communications link based at least in part on performing the HW reset.

Aspect 14: The method, apparatus, or non-transitory computer-readable medium of aspect 13, where the indication to reset the communications link is associated with a first pulse width and the method, apparatuses, and non-transitory computer-readable medium further includes operations, features, circuitry, logic, means, or instructions, or any combination thereof for transmitting a second indication to reset the communications link based at least in part on failing to reestablish the communications link, based at least in part on resetting the one or more first parameters associated with the first protocol layer and maintaining the one or more second parameters associated with the second protocol layer, the second indication to reset the communications link associated with a second pulse width that is different than the first pulse width, where performing the HW reset is based at least in part on transmitting the second indication.

FIG. 7 illustrates a flowchart showing a method 700 that supports reset techniques for protocol layers of a memory system in accordance with examples as disclosed herein. The operations of method 700 may be implemented by a memory system or its components as described herein. For example, the operations of method 700 may be performed by a memory system as described with reference to FIGS. 1 through 3 and 5. In some examples, a memory system may execute a set of instructions to control the functional elements of the device to perform the described functions. Additionally, or alternatively, the memory system may perform aspects of the described functions using special-purpose hardware.

At 705, the method may include establishing a communications link between a host system and a memory system, the communications link based at least in part on one or more first parameters associated with a first protocol layer and one or more second parameters associated with a second protocol layer. The operations of 705 may be performed in accordance with examples as disclosed herein. In some examples, aspects of the operations of 705 may be performed by a link establishment component 525 as described with reference to FIG. 5.

At 710, the method may include receiving, by the memory system, an indication to reset the communications link. The operations of 710 may be performed in accordance with examples as disclosed herein. In some examples, aspects of the operations of 710 may be performed by a reset signal receiver 530 as described with reference to FIG. 5.

At 715, the method may include resetting the one or more first parameters associated with the first protocol layer based at least in part on receiving the indication to reset the communications link. The operations of 715 may be performed in accordance with examples as disclosed herein. In some examples, aspects of the operations of 715 may be performed by a recovery component 535 as described with reference to FIG. 5.

At 720, the method may include attempting to reestablish the communications link between the host system and the memory system based at least in part on resetting the one or more first parameters associated with the first protocol layer and maintaining the one or more second parameters associated with the second protocol layer. The operations of 720 may be performed in accordance with examples as disclosed herein. In some examples, aspects of the operations of 720 may be performed by an LSS component 540 as described with reference to FIG. 5.

In some examples, an apparatus as described herein may perform a method or methods, such as the method 700. The apparatus may include features, circuitry, logic, means, or instructions (e.g., a non-transitory computer-readable medium storing instructions executable by a processor), or any combination thereof for performing the following aspects of the present disclosure:

Aspect 15: A method, apparatus, or non-transitory computer-readable medium including operations, features, circuitry, logic, means, or instructions, or any combination thereof for establishing a communications link between a host system and a memory system, the communications link based at least in part on one or more first parameters associated with a first protocol layer and one or more second parameters associated with a second protocol layer; receiving, by the memory system, an indication to reset the communications link; resetting the one or more first parameters associated with the first protocol layer based at least in part on receiving the indication to reset the communications link; and attempting to reestablish the communications link between the host system and the memory system based at least in part on resetting the one or more first parameters associated with the first protocol layer and maintaining the one or more second parameters associated with the second protocol layer.

Aspect 16: The method, apparatus, or non-transitory computer-readable medium of aspect 15, where resetting the one or more first parameters associated with the first protocol layer includes operations, features, circuitry, logic, means, or instructions, or any combination thereof for resetting one or more protocol state machines, resetting one or more timers, resetting one or more attributes, clearing one or more data buffers, or a combination thereof.

Aspect 17: The method, apparatus, or non-transitory computer-readable medium of any of aspects 15 through 16, where maintaining the one or more second parameters associated with the second protocol layer includes operations, features, circuitry, logic, means, or instructions, or any combination thereof for maintaining one or more attributes associated with the second protocol layer, maintaining one or more flags associated with the second protocol layer, maintaining a logical unit queue associated with the second protocol layer, or a combination thereof.

Aspect 18: The method, apparatus, or non-transitory computer-readable medium of any of aspects 15 through 17, where the first protocol layer includes a Unipro layer, or a PHY layer, or a combination thereof and the second protocol layer includes a UFS transport layer, a UFS application layer, or a combination thereof.

Aspect 19: The method, apparatus, or non-transitory computer-readable medium of any of aspects 15 through 18, where reestablishing the communications link includes operations, features, circuitry, logic, means, or instructions, or any combination thereof for performing, while the memory system is operating in accordance with an HS mode, an HS-LSS.

Aspect 20: The method, apparatus, or non-transitory computer-readable medium of aspect 19, where resetting the one or more first parameters associated with the first protocol layer occurs during at least a portion of performing the HS-LSS.

Aspect 21: The method, apparatus, or non-transitory computer-readable medium of any of aspects 15 through 20, further including operations, features, circuitry, logic, means, or instructions, or any combination thereof for resetting one or more third parameters associated with a third protocol layer based at least in part on receiving the indication to reset the communications link, where attempting to reestablish the communications link is based at least in part on resetting the one or more first parameters associated with the first protocol layer and resetting the one or more third parameters associated with the third protocol layer.

Aspect 22: The method, apparatus, or non-transitory computer-readable medium of any of aspects 15 through 21, further including operations, features, circuitry, logic, means, or instructions, or any combination thereof for detecting an error associated with the first protocol layer and transmitting an indication of the detected error, where receiving the indication to reset the communications link is based at least in part on transmitting the indication of the detected error.

Aspect 23: The method, apparatus, or non-transitory computer-readable medium of any of aspects 15 through 22, further including operations, features, circuitry, logic, means, or instructions, or any combination thereof for transitioning the communications link from an HS link to a PWM link based at least in part on failing to reestablish the communications link based at least in part on resetting the one or more first parameters associated with the first protocol layer and maintaining the one or more second parameters associated with the second protocol layer, and based at least in part on performing a line reset operation; transmitting, while the memory system is operating according to a PWM mode, a power configuration associated with the communications link; reestablishing the communications link based at least in part on transmitting the power configuration; and transitioning the communications link from the PWM link to the HS link based at least in part on reestablishing the communications link.

Aspect 24: The method, apparatus, or non-transitory computer-readable medium of any of aspects 15 through 23, further including operations, features, circuitry, logic, means, or instructions, or any combination thereof for performing a HW reset based at least part on failing to reestablish the communications link based at least in part on one or more first parameters associated with a first protocol layer and one or more second parameters associated with a second protocol layer and attempting to reestablish the communications link based at least in part on performing the HW reset.

Aspect 25: The method, apparatus, or non-transitory computer-readable medium of aspect 24, where the indication to reset the communications link is associated with a first pulse width and the method, apparatuses, and non-transitory computer-readable medium further includes operations, features, circuitry, logic, means, or instructions, or any combination thereof for receiving a second indication to reset the communications link based at least in part on failing to reestablish the communications link based at least in part on one or more first parameters associated with a first protocol layer and one or more second parameters associated with a second protocol layer, the second indication associated with a second pulse width that is different than the first pulse width, where performing the HW reset is based at least in part on receiving the second indication.

It should be noted that the described techniques include possible implementations, and that the operations and the steps may be rearranged or otherwise modified and that other implementations are possible. Further, portions from two or more of the methods may be combined.

Information and signals described herein may be represented using any of a variety of different technologies and techniques. For example, data, instructions, commands, information, signals, bits, or symbols of signaling that may be referenced throughout the above description may be represented by voltages, currents, electromagnetic waves, magnetic fields or particles, optical fields or particles, or any combination thereof. Some drawings may illustrate signals as a single signal: however, the signal may represent a bus of signals, where the bus may have a variety of bit widths.

The terms "electronic communication," "conductive contact," "connected," and "coupled" may refer to a relationship between components that supports the flow of signals between the components. Components are considered in electronic communication with (or in conductive contact with or connected with or coupled with) one another if there is any conductive path between the components that can, at any time, support the flow of signals between the components. At any given time, the conductive path between components that are in electronic communication with each other (or in conductive contact with or connected with or coupled with) may be an open circuit or a closed circuit according to the operation of the device that includes the connected components. The conductive path between connected components may be a direct conductive path between the components or the conductive path between connected components may be an indirect conductive path that may include intermediate components, such as switches, transistors, or other components. In some examples, the flow of signals between the connected components may be interrupted for a time, for example, using one or more intermediate components such as switches or transistors.

The terms "if," "when," "based on," or "based at least in part on" may be used interchangeably. In some examples, if the terms "if," "when," "based on," or "based at least in part on" are used to describe a conditional action, a conditional process, or connection between portions of a process, the terms may be interchangeable.

The term "in response to" may refer to one condition or action occurring at least partially, if not fully, as a result of a previous condition or action. For example, a first condition or action may be performed and second condition or action may at least partially occur as a result of the previous condition or action occurring (whether directly after or after one or more other intermediate conditions or actions occurring after the first condition or action).

Additionally, the terms "directly in response to" or "in direct response to" may refer to one condition or action occurring as a direct result of a previous condition or action. In some examples, a first condition or action may be performed and second condition or action may occur directly as a result of the previous condition or action occurring independent of whether other conditions or actions occur. In some examples, a first condition or action may be performed and second condition or action may occur directly as a result of the previous condition or action occurring, such that no other intermediate conditions or actions occur between the earlier condition or action and the second condition or action or a limited quantity of one or more intermediate steps or actions occur between the earlier condition or action and the second condition or action. Any condition or action described herein as being performed "based on." "based at least in part on," or "in response to" some other step, action, event, or condition may additionally, or alternatively (e.g., in an alternative example), be performed "in direct response to" or "directly in response to" such other condition or action unless otherwise specified.

The description set forth herein, in connection with the appended drawings, describes example configurations and does not represent all the examples that may be implemented or that are within the scope of the claims. The term "exemplary" used herein means "serving as an example, instance, or illustration" and not "preferred" or "advantageous over other examples." The detailed description includes specific details to provide an understanding of the described techniques. These techniques, however, may be practiced without these specific details. In some instances, well-known structures and devices are shown in block diagram form to avoid obscuring the concepts of the described examples.

In the appended figures, similar components or features may have the same reference label. Further, various components of the same type may be distinguished by following the reference label by a hyphen and a second label that distinguishes among the similar components. If just the first reference label is used in the specification, the description is applicable to any one of the similar components having the same first reference label irrespective of the second reference label.

The functions described herein may be implemented in hardware, software executed by a processor, firmware, or any combination thereof. If implemented in software executed by a processor, the functions may be stored on or transmitted over, as one or more instructions or code, a computer-readable medium. Other examples and implementations are within the scope of the disclosure and appended claims. For example, due to the nature of software, the described functions can be implemented using software executed by a processor, hardware, firmware, hardwiring, or combinations of any of these. Features implementing functions may also be physically located at various positions, including being distributed such that portions of functions are implemented at different physical locations.

For example, the various illustrative blocks and components described in connection with the disclosure herein may be implemented or performed with a general-purpose processor, a DSP, an ASIC, an FPGA or other programmable logic device, discrete gate or transistor logic, discrete hardware components, or any combination thereof designed to perform the functions described herein. A general-purpose processor may be a microprocessor, but in the alternative, the processor may be any processor, controller, microcontroller, or state machine. A processor may be implemented as a combination of computing devices (e.g., a combination of a DSP and a microprocessor, multiple microprocessors, one or more microprocessors in conjunction with a DSP core, or any other such configuration).

As used herein, including in the claims, "or" as used in a list of items (for example, a list of items prefaced by a phrase such as "at least one of" or "one or more of") indicates an inclusive list such that, for example, a list of at least one of A, B. or C means A or B or C or AB or AC or BC or ABC (i.e., A and B and C). Also, as used herein, the phrase "based on" shall not be construed as a reference to a closed set of conditions. For example, an exemplary step that is described as "based on condition A" may be based on both a condition A and a condition B without departing from the scope of the present disclosure. In other words, as used herein, the phrase "based on" shall be construed in the same manner as the phrase "based at least in part on."

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media can comprise RAM, ROM, electrically erasable programmable read-only memory (EEPROM), compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include CD, laser disc, optical disc, digital versatile disc (DVD), floppy disk, and Blu-ray disc, where disks usually reproduce data magnetically, while discs reproduce data optically with lasers. Combinations of these are also included within the scope of computer-readable media.

The description herein is provided to enable a person skilled in the art to make or use the disclosure. Various modifications to the disclosure will be apparent to those skilled in the art, and the generic principles defined herein may be applied to other variations without departing from the scope of the disclosure. Thus, the disclosure is not limited to the examples and designs described herein but is to be accorded the broadest scope consistent with the principles and novel features disclosed herein.

What is claimed is:

1. An apparatus, comprising:
one or more memory devices of a memory system; and
a controller of the memory system coupled with the one or more memory devices and configured to cause the apparatus to:
establish a communications link between a host system and the memory system, the communications link based at least in part on one or more first parameters associated with a first protocol layer and one or more second parameters associated with a second protocol layer;
receive an indication to reset the communications link;
reset the one or more first parameters associated with the first protocol layer based at least in part on receiving the indication to reset the communications link; and
attempt to reestablish the communications link between the host system and the memory system based at least in part on resetting the one or more first parameters associated with the first protocol layer and maintaining the one or more second parameters associated with the second protocol layer, wherein the one or more second parameters comprise at least one or more volatile attributes associated with the second protocol layer, one or more set only attributes associated with the second protocol layer, or any combination thereof.

2. The apparatus of claim 1, wherein, to reset the one or more first parameters associated with the first protocol layer, the controller is configured to cause the apparatus to:
reset one or more protocol state machines, reset one or more timers, reset one or more attributes, clear one or more data buffers, or a combination thereof.

3. The apparatus of claim 1, wherein, to maintain the one or more second parameters associated with the second protocol layer, the controller is configured to cause the apparatus to:
maintain one or more flags associated with the second protocol layer, maintain a logical unit queue associated with the second protocol layer, or a combination thereof, wherein the one or more flags comprise volatile flags, set only flags, or any combination thereof.

4. The apparatus of claim 1, wherein:
the first protocol layer comprises a Unipro layer, a physical layer, or a combination thereof; and the second protocol layer comprises a universal flash storage transport layer, a universal flash storage application layer, or a combination thereof.

5. The apparatus of claim 1, wherein, to reestablish the communications link, the controller is configured to cause the apparatus to:

perform, while the memory system is operating in accordance with a high speed mode, a high speed link startup sequence.

6. The apparatus of claim 5, wherein the reset of the one or more first parameters associated with the first protocol layer occurs during at least a portion of performing the high speed link startup sequence.

7. The apparatus of claim 1, wherein the controller is further configured to cause the apparatus to:

reset one or more third parameters associated with a third protocol layer based at least in part on receiving the indication to reset the communications link, wherein attempting to reestablish the communications link is based at least in part on resetting the one or more first parameters associated with the first protocol layer and resetting the one or more third parameters associated with the third protocol layer.

8. The apparatus of claim 1, wherein the controller is further configured to cause the apparatus to:

detect an error associated with the first protocol layer; and transmit an indication of the detected error, wherein receiving the indication to reset the communications link is based at least in part on transmitting the indication of the detected error.

9. The apparatus of claim 1, wherein controller is further configured to cause the apparatus to:

transition the communications link from a high speed link to a pulse-width-modulation link based at least in part on failing to reestablish the communications link based at least in part on resetting the one or more first parameters associated with the first protocol layer and maintaining the one or more second parameters associated with the second protocol layer, and based at least in part on performing a line reset operation;

transmit, while the memory system is operating according to a pulse-width-modulation mode, a power configuration associated with the communications link;

reestablish the communications link based at least in part on transmitting the power configuration; and transition the communications link from the pulse-width-modulation link to the high speed link based at least in part on reestablishing the communications link.

10. The apparatus of claim 1, wherein the controller is further configured to cause the apparatus to:

perform a hardware reset based at least part on failing to reestablish the communications link based at least in part on the one or more first parameters associated with the first protocol layer and the one or more second parameters associated with the second protocol layer; and attempt to reestablish the communications link based at least in part on performing the hardware reset.

11. The apparatus of claim 10, wherein the indication to reset the communications link is associated with a first pulse width, and wherein the controller is further configured to cause the apparatus to:

receive a second indication to reset the communications link based at least in part on failing to reestablish the communications link based at least in part on the one or more first parameters associated with the first protocol layer and the one or more second parameters associated with the second protocol layer, the second indication associated with a second pulse width that is different than the first pulse width, wherein performing the hardware reset is based at least in part on receiving the second indication.

12. An apparatus, comprising:

a controller of a host system configured to couple with a memory system, wherein the controller is configured to cause the apparatus to:

establish a communications link between the host system and the memory system, the communications link based at least in part on one or more first parameters associated with a first protocol layer and one or more second parameters associated with a second protocol layer;

transmit an indication to reset the communications link;

reset the one or more first parameters associated with the first protocol layer based at least in part on transmitting the indication to reset the communications link; and attempt to reestablish the communications link between the host system and the memory system based at least in part on resetting the one or more first parameters associated with the first protocol layer and maintaining the one or more second parameters associated with the second protocol layer, wherein the one or more second parameters comprise at least one or more volatile attributes associated with the second protocol layer, one or more set only attributes associated with the second protocol layer, or any combination thereof.

13. The apparatus of claim 12, wherein, to reset the one or more first parameters associated with the first protocol layer, the controller is configured to cause the apparatus to:

reset one or more protocol state machines associated with the first protocol layer, reset one or more timers associated with the first protocol layer, reset one or more attributes associated with the first protocol layer, clear one or more data buffers associated with the first protocol layer, or a combination thereof.

14. The apparatus of claim 12, wherein, to maintain the one or more second parameters associated with the second protocol layer, the controller is configured to cause the apparatus to:

maintain one or more flags associated with the second protocol layer, maintain a logical unit queue associated with the second protocol layer, or a combination thereof, wherein the one or more flags comprise volatile flags, set only flags, or any combination thereof.

15. The apparatus of claim 12, wherein, to reestablish the communications link, the controller is configured to cause the apparatus to:

perform, while the host system is operating in accordance with a high speed mode, a high speed link startup sequence.

16. The apparatus of claim 12, wherein the controller is further configured to cause the apparatus to:

reset one or more third parameters associated with a third protocol layer based at least in part on transmitting the indication to reset the communications link, wherein attempting to reestablish the communications link is based at least in part on resetting the one or more first parameters associated with the first protocol layer and resetting the one or more third parameters associated with the third protocol layer.

17. The apparatus of claim 12, wherein the controller is further configured to cause the apparatus to:

detect an error associated with the first protocol layer, wherein transmitting the indication to reset the communications link is based at least in part on detecting the error.

18. The apparatus of claim 12, wherein the controller is further configured to cause the apparatus to:

transition the communications link from a high speed link to a pulse-width-modulation link based at least in part on failing to reestablish the communications link based at least in part on resetting the one or more first parameters associated with the first protocol layer and maintaining the one or more second parameters associated with the second protocol layer, and based at least in part on performing a line reset operation;

receive, while the host system is operating according to a pulse-width-modulation mode, a power configuration associated with the communications link;

attempt to reestablish the communications link based at least in part on receiving the power configuration; and transition the communications link from the pulse-width-modulation link to the high speed link based at least in part on reestablishing the communications link.

19. The apparatus of claim 12, wherein the controller is further configured to cause the apparatus to:

perform a hardware reset based at least part on failing to reestablish the communications link based at least in part on resetting the one or more first parameters associated with the first protocol layer and maintaining the one or more second parameters associated with the second protocol layer; and attempt to reestablish the communications link based at least in part on performing the hardware reset.

20. A method at a memory system, comprising:

establishing a communications link between a host system and the memory system, the communications link based at least in part on one or more first parameters associated with a first protocol layer and one or more second parameters associated with a second protocol layer;

receiving an indication to reset the communications link;

resetting the one or more first parameters associated with the first protocol layer based at least in part on receiving the indication to reset the communications link; and attempting to reestablish the communications link between the host system and the memory system based at least in part on resetting the one or more first parameters associated with the first protocol layer and maintaining the one or more second parameters associated with the second protocol layer, wherein the one or more second parameters comprise at least one or more volatile attributes associated with the second protocol layer, one or more set only attributes associated with the second protocol layer, or any combination thereof.

* * * * *